US010887176B2

(12) United States Patent
Fitzgerald et al.

(10) Patent No.: US 10,887,176 B2
(45) Date of Patent: Jan. 5, 2021

(54) PREDICTING RESOURCE DEMAND IN COMPUTING ENVIRONMENTS

(71) Applicant: HEWLETT PACKARD ENTERPRISE DEVELOPMENT LP, Houston, TX (US)

(72) Inventors: Marty Fitzgerald, Westborough, MA (US); Jiri Schindler, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 165 days.

(21) Appl. No.: 15/473,729

(22) Filed: Mar. 30, 2017

(65) Prior Publication Data
US 2018/0287955 A1    Oct. 4, 2018

(51) Int. Cl.
| G06F 15/173 | (2006.01) |
| H04L 12/24 | (2006.01) |
| G06F 9/455 | (2018.01) |
| G06F 9/50 | (2006.01) |

(52) U.S. Cl.
CPC ...... *H04L 41/0896* (2013.01); *G06F 9/45558* (2013.01); *G06F 9/50* (2013.01); *G06F 2009/4557* (2013.01); *G06F 2009/45579* (2013.01)

(58) Field of Classification Search
CPC ...................................................... G06F 3/061
See application file for complete search history.

(56) References Cited

U.S. PATENT DOCUMENTS

| 7,103,595 B2 | 9/2006 | Anastasiadis et al. |
| 7,139,781 B2 | 11/2006 | Young |
| 7,454,592 B1 | 11/2008 | Shah |
| 7,747,663 B2 | 6/2010 | Atkin et al. |
| 7,814,078 B1 | 10/2010 | Forman |
| 8,028,106 B2 | 9/2011 | Bondarant et al. |

(Continued)

OTHER PUBLICATIONS

IBM, AIX 5L Version 5.2 General Programming Concepts: Writing and Debugging Programs, 2004 ("GPC") (SPR00000788-SPR00001403).

(Continued)

*Primary Examiner* — Umar Cheema
*Assistant Examiner* — Tesfu N Mekonen
(74) *Attorney, Agent, or Firm* — Jaffery Watson Mendonsa & Hamilton

(57) ABSTRACT

In some examples, a method can involve collecting resource consumption data for resource consumer objects associated with hosts in a computing environment. The method can involve identifying, for each respective host, a respective set of resource consumer objects at the host and, based on the resource consumption data, determining a projected resource consumption history for each host, the projected resource consumption history being based on a combined resource consumption, over a period of time, associated with the respective set of resource consumer objects currently hosted a the host. The method can involve calculating a projected resource availability for each host based on a respective resource capability of the host and the projected resource consumption history for the host, and selecting a particular host for a resource consumer object based on the projected resource availability of each host.

20 Claims, 11 Drawing Sheets

(56) References Cited

U.S. PATENT DOCUMENTS

| | | | |
|---|---|---|---|
| 8,140,625 | B2 | 3/2012 | Dubnicki et al. |
| 8,140,786 | B2 | 3/2012 | Bunte et al. |
| 8,478,799 | B2 | 7/2013 | Beaverson et al. |
| 2004/0148306 | A1 | 7/2004 | Moulton et al. |
| 2006/0036898 | A1 | 2/2006 | Doering |
| 2007/0271560 | A1* | 11/2007 | Wahlert ............... G06F 8/61 718/1 |
| 2011/0022566 | A1* | 1/2011 | Beaverson ........ G06F 17/30097 707/639 |
| 2011/0213508 | A1* | 9/2011 | Mandagere ............... G06F 1/28 |
| 2013/0346615 | A1* | 12/2013 | Gondi .................. G06F 9/5016 709/226 |
| 2016/0070601 | A1* | 3/2016 | Yamamoto ........... G06F 9/5088 718/105 |
| 2018/0097744 | A1* | 4/2018 | Hu ........................ H04L 47/823 |
| 2018/0139100 | A1* | 5/2018 | Nagpal ................... H04L 41/12 |

OTHER PUBLICATIONS

IBM, AIX 5L Version 5.2 System Management Concepts: Operating System and Devices, 2004 ("SMC") (SPR00001404-SPR00001593).

USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2.

USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below).

Wikipedia: "Object Storage" (available at https://en.wikipedia.org/wiki/Object_storage) (last visited Dec. 6, 2016), SimpliVity Exhibit 2001, *Springpath v. SimpliVity* IPR2016-01779.

Webopedia: "Inode" (available at http://www.webopedia.com/TERM/I/inode.html) (last visited Dec. 20, 2016), SimpliVity Exhibit 2002, *Springpath v. SimpliVity* IPR2016-01779.

Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath v. SimpliVity* IPR2016-01779.

"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath v. SimpliVity* IPR2016-01779.

"Understanding Object Storage and Block Storage use cases," Jul. 20, 2015 (available at http://cloudacademy.com/blog/object-storage-block-storage/) (last visited Dec. 22, 2016), SimpliVity Exhibit 2005, *Springpath v. SimpliVity* IPR2016-01779.

"OBFS: A File System for Object-based Storage Devices." Feng, et al., 2004, SimpliVity Exhibit 2006, *Springpath v. SimpliVity* IPR2016-01779.

"Oasis: An active storage framework for object storage platform," Xie, et al., 2015, SimpliVity Exhibit 2007, *Springpath v. SimpliVity* IPR2016-01779.

Wikipedia: "Namespace" (available at https://en.wikipedia.org/wiki/Namespace) (last visited Dec. 6, 2016), SimpliVity Exhibit 2008, *Springpath v. SimpliVity* IPR2016-01779.

Weopedia: "Namespace" (available at http://www.webopedia.com/TERM/N/namespace.html) (last visited Dec. 20, 2016), SimpliVity Exhibit 2009, *Springpath v. SimpliVity* IPR2016-01779.

USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted), 48 pages.

USENIX Association, "Proceedings of the First Symposium on Networked Systems Design and Implementation," Mar. 2004, pp. 1-15, San Francisco, CA, USA.

Simplivity Corporation's Reply Claim Construction Brief, Case 4:15-cv-13345-TSH, Document 132, Jul. 24, 2017, pp. 1-23.

Simplivity Corporation's Opening Claim Construction Brief, Case 4:15-cv-13345-TSH, Document 130, Jul. 10, 2017, pp. 1-21.

SimpliVity Corporation's Markman Hearing Transcript, Case No. 15cv13345-TSH, Aug. 16, 2017, pp. 1-119.

Petitioner's Reply to Patent Owner's Preliminary Response, Case IPR2017-01933, U.S. Pat. No. 8,478,799, Feb. 28, 2018, pp. 1-17.

Patent Owner's Preliminary Response Pursuant to 37 CFR 42.107(a), Case IPR2017-01933, U.S. Pat. No. 8,478,799, Dec. 21, 2017, pp. 1-47.

Joint Claim Construction and Prehearing Statement, Case 4:15-cv-13345-TSH, Document 136, Aug. 7, 2017, pp. 1-8.

Hewlett Packard Enterprise Company's Response to Springpath's Supplemental Claim Construction Brief, C.A. No. 4:15-cv-13345-TSH, Oct. 30, 2017, pp. 1-5.

Frank Dabek, "A Distributed Hash Table," Sep. 2005, pp. 1-135, Massachusetts Institute of Technology.

Defendant Springpath, Inc.'s Repiy Claim Construction Brief, Case 4:15-cv-13345-TSH, Document 133, Jul. 24, 2017, pp. 1-17.

Defendant Springpath, Inc.'s Preliminary Claim Construction Brief with Exhibits, Case 4:15-cv-13345-TSH, Document 129, Jul. 10, 2017 pp. 1-138.

Defendant Springpath, Inc.'s Motion for Leave to File Supplemental Claim Construction Brief, Case 4:15-cv-13345-TSH, Document 146, Oct. 17, 2017, pp. 1-5.

Decision Denying Institution of Inter Partes Review, Case IPR2017-01933, U.S. Pat. No. 8,478,799 B2, Mar. 16, 2018, pp. 1-18, USPTO.

USPTO PTAB Decision Denying Institution of Inter Partes Review entered Mar. 22, 2017, *Springpath, Inc.* v. *SimpliVity Corp.*, Case IPR2016-01780, U.S. Pat. No. 8,478,799 B2.

USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted).

Petition for Inter Partes Review of U.S. Pat. No. 8,478,799 before the USPTO Patent Trial and Appeal Board dated Sep. 14, 2016, Case IPR2016-01779.

Declaration of Darrell D.E.Long, Ph.D. Regarding U.S. Pat. No. 8,478,799 dated Sep. 14, 2016, Case IPR2016-01779 (Springpath Exhibit 1002).

Li, et al., Secure Untrusted Data Repository (SUNDR), OSDI '04: 6th Symposium on Operating Systems Design and Implementation, pp. 122-136, USENIX Association (Springpath Exhibits 1003 & 1103).

Sandberg, et al., Design and Implementation of the Sun Network Filesystem, Sun Microsystems, Mountain View, CA, (12 pp.) (Springpath Exhibits 1004 & 1116).

US Patent and Trademark Office non-final Office Action dated Aug. 30, 2012 in U.S. Appl. No. 12/823,922 (Springpath Exhibits 1006 & 1106).

Response to USPTO non-final Office Action dated Aug. 30, 2012 filed Dec. 18, 2012 in U.S. Appl. No. 12/823,922 (Springpath Exhibits 1009 & 1109).

Quinlan, et al., Venti: a new approach to archival storage, Bell Labs, Lucent Technologies, 1-13 pp (Springpath Exhibits 1008 & 1108).

US Patent and Trademark Office final Office Action dated Feb. 22, 2013 in U.S. Appl. No. 12/823,922 (Springpath Exhibits 1010 & 1110).

Response to USPTO final Office Action dated Feb. 22, 2013 filed May 8, 2013 in U.S. Appl. No. 12/823,922 (Springpath Exhibits 1012 & 1112).

Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/index1.html (Springpath Exhibits 1011 & 1111).

US Patent and Trademark Office Notice of Allowance dated May 29, 2013 in U.S. Appl. No. 12/823,922 (Springpath Exhibits 1013 & 1113).

Petition for Inter Partes Review of U.S. Pat. No. 8,478,799 before the USPTO Patent Trial and Appeal Board dated Sep. 14, 2016, Case IPR2016-01780.

(56) References Cited

OTHER PUBLICATIONS

Declaration of Darrell D.E.Long, Ph.D. Regarding U.S. Pat. No. 8,478,799 dated Sep. 14, 2016, Case IPR2016-01780 (Springpath Exhibit 1102).
IEEE The Open Group, 1003.1TM Standard for Information Technology—Portable Operating System Interface (POSIX (R)) System Interfaces, Issue 6, IEEE Std 1003.1-2001, Approved Sep. 12, 2001 The Open Group (2 pp.) (Springpath Exhhibits 1014 & 1114).
IEEE The Open Group, 1003.1TM Standard for Information Technology—Portable Operating System Interface (Posix (R)) Base Definitions, Issue 6, IEEE Std 1003.1-2001, Approved Sep. 12, 2001 The Open Group (8 pp.) (Springpath Exhibits1015 & 1115).
Rhea et al., Fast, Inexpensive Content-Addressed Storage in Foundation, 2008 ("Rhea")(SPR00000354-SPR00000367).
Richie et al., The UNIX Time-Sharing System, 1974 ("Richie")(SPR00000368-SPR00000378).
Levanoni et al., An On-the-Fly Reference-Counting Garbage Collector for Java, 2001 ("Levanoni")(SPR00000379-SPR00000445).
Boehm et al., Garbage Collection in an Uncooperative Environment, 1998 ("Boehm")(SPR00000446-SPR00000462).
1003.1™ Standard for Information Technology—Portable Operating System Interface (POSIX®), System Interfaces, Issue 6, 2001 ("POSIX_SI_2001")(SPR00000463-SPR00000464).
Harel Paz, Efficient Memory Management for Servers, 2006 ("Paz")(SPR00000465-SPR00000692).
Grembowski et al., Comparative Analysis of the Hardware Implementations of Hash Functions SHA-1 and SHA-512, 2002 ("Grembowski")(SPR00000693-SPR00000707).
Chaves et al., Cost-Efficient SHA Hardware Accelerators, 2008 ("Chaves")(SPR00000708-SPR00000717).
Hitz et al., File System Design for an NFS File Server Appliance, 1994 ("Hitz")(SPR00000718-SPR00000740).
Kawaguchi et al., A Flash-Memory Based File System, 1995 ("Kawaguchi")(SPR00000741-SPR00000750).
You et al., Deep Store: An Archival Storage System Architecture, 2005 ("You")(SPR00000751-SPR00000762).
McKusick et al., A fast file system for UNIX, 1984 ("McKusick")(SPR00000763-SPR00000779).
The EMC Centera and TOWER Technology Advantage, 2002 ("Centera")(SPR00000780-SPR00000787).
Hutchinson et al., *Logical vs. Physical File System Backup*, 1999 ("Hutchinson")(SPR00001594-1605).
Petition for Inter Partes Review of U.S. Pat. No. 8,478,799 filed Aug. 11, 2017, case IPR2017-01933, 92 pages. The citations from PIR2017-01933 are submiited herewith below.
Prosecution History of the U.S. Pat. No. 8,478,799, 576 pages.
U.S. Appl. No. 61/269,633, 32 pages.
Prashant Shenoy, "Declaration of Prashant Shenoy, PhD, Under 37 C.F.R. § 1.68 in Support of Petition for Inter Partes Review of U.S. Pat. No. 8,478,799", dated Aug. 11, 2017, 196 pages.
"Curriculum Vitae of Dr. Prashant Shenoy", 2017, 31 pages.
Athicha Muthitathoroen, et al., "Ivy: A Read/Write Peer-to-Peer File System," Proceedings of the 5th Symposium on Operating Systems Design and implementation (OSDI '02), Operating Systems Review; vol. 36, Issue SI (Winter 2002), 21 pages.
Frank Dabek, et al., "Wide-area cooperative storage With CFS," Proceedings of the 18th ACM Symposium on Operating Systems Principles (SOSP'01), Operating Systems Review, vol. 35, No. 5 (Dec. 2001), pp. 1-19.
Nitin Agrawal, et al., "Design Tradeoffs for SSD Performance," USENIX'08: 2008 USENIX Annual Technical Conference, Jun. 25, 2008, pp. 57-70.
Marshall Kirk McKusick, et al., "The Design and Implementation of the FreeBSD Operating System", FreeBSD version 5.2, CSCO-1011, (2005), pp. 1-43.
Josh Cates, "Robust and Efficient Data Management for a Distributed Hash Table", Jun. 2003, 64 pages.
Marice J. Bach, The Design of the UNIX Operating System (1986), 8 pages.
Prashant Shenoy, et al., "Symphony: An Integrated Multimedia File System," Proceedings of SPIE 3310, Multimedia Computing and Networking 1998, pp. 124-138.
Garth Gibson, et al., "A Cost-Effective, High-Bandwidth Storage Architecture," Proceedings of the 8th Conference on Architectural Support for Programming Languages and Operating Systems, 1998, pp. 92-103.
Mike Mesnier, et al., "Object-Based Storage," IEEE Communication Magazine, Aug. 2003, pp. 84-90.
R. Rivest, "The MD5 Message-Digest Algorithm," Request for Comments 1321, Internet Engineering Task Force, CSCO-1017, Apr. 1992, 21 pages.
Sean Quinlan, et al., "Venti: a new approach to archival storage," Proceedings of Fast 2002 Conference of File and Storage Technologies, Jan. 28-30, 2002, pp. 1-14.
Bruce Eckel, "C++ Inside & Out", 1992, 6 pages.
Mendel Rosenblum, "The Design and Implementation of a Log Logstructuredfile System", Kluwer Academic Publishers, 1995, 3 pages.
Webster's New World Computer Dictionary, 10th Ed. 2003, 3 pages.
Microsoft Computer Dictionary, 5th Ed., 2002, 7 pages.
"AMD Athlon Processor", ADM Technical Brief, Publication # 22054, Rev. D, Issue date Dec. 1999, 10 pages.
Stevens, et al., "The first collision for full SHA-1," International Association for Cryptology Research 2017, pp. 570-596.
Andrew S. Tanenbaum, "Modern Operating Systems", 2d Ed., 2001, 7 pages.
Alan Freedman, "Computer Desktop Encyclopedia 9th Ed", Osborne/McGraw-Hill, 2001, 7 pages.
Sang-Won Lee, et al., "A Case for Flash Memory SSD in Enterprise Database Applications," Proceedings of the 2008 ACM SIGMOD International Conference on Management of Data, Jun. 9-12, 2008, pp. 1075-1086.
Bruce Schneier, "Applied Cryptography, 2d Ed, Protocol, Algorithms, and Source Code in C", John Wiley & Sons, Inc., 1996, 4 pages.
Martin Placek, "Storage Exchange: A Global Platform for Trading Distributed Storage Services," Master of Engineering Science Thesis, The University of Melbourne, Australia, Jul. 2006, 185 pages.
Ragib Hasan, et al., "A Survey of Peer-to-Peer Storage Techniques for Distributed File Systems," international Conference on Information Technology: Coding and Computing, 2005, 9 pages.
"Frequently Asked Questions for FreeBSD 2.X, 3.X and 4.X", unknown date, 8 pages,. Archived at https://web.archive.org/web/20020404064240/http://www.freebsd.org:80/doc/en_US.ISO8859-1/books/faq/install.html.
"Preliminary Information, AMD Athlon, Processor Module Data Sheet", AMD Athlon, Publication #21016, Rev. M, Issue Date: Jun. 2000, 74 pages.
AMD Athion™, "Processor Quick Reference FAQ", Feb. 3, 2000, 12 pages.
"MARC Record information for Operating Systems Review"— Proceedings of the Fifth ACM Symposium on Operating Systems Design and Implementation (OSDI'02), available at the WRLC online catalog, accessed Jul. 20, 2017, 3 pages.
"Bibliographic Record Information for Operating Systems Review"— Proceedings of the Fifth ACM Symposium on Operating Systems Design and Implementation (OSDI'02), Dec. 9-11, 2002, available at the WRLC online catalog, accessed Jul. 20, 2017, 2 pages.
"MARC Record Information for Operating Systems Review"— Proceedings of the 18th ACM Symposium on Operating Systems Principles (SOSP'01), 2001, available at the online catalog of the Library of Congress, accessed Jul. 31, 2017, 3 pages.
"Bibliographic Record information for Operating Systems Review"— Proceedings of the 18th ACM Symposium on Operating Systems Principles (SOSP'01), 2001, available at the online catalog of the Library of Congress, accessed Jul. 31, 2017, 3 pages.
"Operating Systems Review"—Proceedings of the 18th ACM Symposium on Operating Systems Principles (SOSP'01), vol. 35, No. 5, pp. 202-215, Oct. 21-24, 2001, obtained from a CD-ROM from Auburn University, 11 pages.
"MARC Record Information for Operating Systems Review"— Proceedings of the 18th ACM Symposium on Operating Systems

(56) References Cited

OTHER PUBLICATIONS

Principles (SOSP'01), Oct. 21-24, 2001, CD-ROM, available at the Auburn University Library online catalog, accessed Jul. 28, 2017, 1 page.
"Bibliographic: Record Information for Operating Systems Review"—Proceedings of the 18th ACM Symposium on Operating Systems Principles (SOSP'01) CD-ROM, Oct. 21-24. 2001, available at the Auburn University Library online catalog, accessed Jul. 28, 2017, 1 pages.
"Scan of CD-ROM and CD-ROM Case, Operating Systems Review"—Proceedings of the 18th ACM Symposium on Operating Systems Principles (SOSP'01), Oct. 21-24, 2001, CD-ROM obtained from the Auburn University Library, 1 page.
Byung-Gon Chun, et al., "Efficient Replica Maintenance for Distributed Storage Systems," USENIX Association, Proceedings of NSDI '06: 3rd Symposium on Networked Systems Design & Implementation, 2006, pp. 45-58.
Dabek, F., et al., "Wide-area cooperative storage with CFS," Operating Systems Review—Proceedings of the 18th ACM Symposium on Operating Systems Principles (SOSP'01), vol. 35, No. 5, 2001, pp. 202-215.
Ingrid Hsieh-Yee, "Declaration of Ingrid Hsieh-Yee, PhD, Under 37 C.F.R. § 1.68 in Support of Petition for Inter Partes Review of U.S. Pat. No. 8,478,799", dated Aug. 10, 2017, 77 pages.
Michele Nelson, "Declaration of Michele Nelson, Under 37 C.F.R. § 1.68", dated Aug. 9, 2017, 92 pages.
David Bader, "Declaration of David Bader, Under 37 C.F.R. § 1.68", dated Aug. 10, 2017, 31 pages.
MARC Record Information,"The Design and Implementation of the FreeBSD Operating System", 2005, 2 pages, available at the online catalog of the Library of Congress, accessed Aug. 3, 2017.
Bibliographic Record Information, "The Design and Implementation of the FreeBSD Operating System", 2005, 2 pages, available at the online catalog of the Library of Congress, accessed Aug. 3, 2017.
Marshall Kirk McKusick, et al., "The Design and Implementation of the FreeBSD Operating System", FreeBSD version 5.2, 2005, 32 pages, obtained from the George Mason University Library.
MARC Record information. "The Design and Implementation of the FreeBSD Operating System" 2005, 2 pages, available at the online catalog of the George Mason University Library, accessed Aug. 3, 2017.
Bibliographic Record Information for "The Design and Implemention of the FreeBSD Operating System", 2005, 2 pages, available at the online catalog of the George Mason University Library, accessed Aug. 3, 2017.
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1, listing references cited herein.
Li et al., Secure Untrusted Data Repository (SUNDR), 2004 ("Li")(SPR00000113-PR000000128).
Sandberg et al., Design and implementation of the Sun network filesystem, 1985 ("Sandberg")(SPR00000129-SPR00000140).
Quinlan et al., Venti: A New Approach to Archival Storage, 2002 ("Quinlan")(SPR00000141-SPR00000154).
Best et al., JFS Layout: How the Journaled File System Handles the On-Disk Layout, 2000 ("Best")(SPRO0000155-SPR00000197).
Zhu et al., Avoiding the Disk Bottleneck in the Data Domain Deduplication File System, 2008 ("Zhu") (SPR00000198-SPR00000211).
Abd-El-Malek et al., Ursa Minor: Versatile Cluster-Based Storage, 2005 ("Abd-El-Malek")(SPR00000212-SPR00000225).
Bobbarjung et al., Improving Duplicate Elimination in Storage Systems, 2006 ("Bobbarjung")(SPR00000226-SPR00000248).
Cox et al., Pastiche: Making Backup Cheap and Easy, 2002 ("Cox")(SPR00000249-SPR00000263).
Dabek et al., Wide-Area Cooperative Storage With CFS, 2001 ("Dabek")(SPR00000264-SPR00000277).
Debnath et al., ChunkStash: Speeding up Inline Storage Deduplication Using Flash Memory, 2010 ("Debnath") SPR00000278-SPR00000292).
Fu et al., Fast and Secure Distributed Read-Only File System, 2000 ("Fu 2000")(SPR00000293-SPR00000308).
Fu et al., Fast and Secure Distributed Read-Only File System, 2002 ("Fu")(SPR00000309-SPR00000332).
Mesnier et al., Object-Based Storage, 2003 ("Mesnier")(SPR00000333-SPR00000339).
Muthitacharoen et al., Ivy: A Read/Write Peer-to-Peer File System, 2002 ("Muthitacharoen")(SPR00000340-SPR00000353).

\* cited by examiner

PREDICTING RESOURCE DEMAND IN COMPUTING ENVIRONMENTS

TECHNICAL FIELD

The present technology pertains to predicting resource demands in computing environments, and more specifically, the present technology involves predicting resource demands in a system based on a multi-variate analysis of historical data.

BACKGROUND

Network professionals have realized that greater workload mobility, increased performance, and higher utilization of shared physical server resources can be achieved by decoupling applications from the underlying hardware. This has driven a rapid shift in the industry toward virtualization and software-defined solutions. Virtualization turns physical devices into resource pools that are independent of their underlying physical assets. Physical devices can serve as hosts for resource consumer objects, such as virtual machines and software containers. Resource pools can serve as logical containers representing aggregate resource allocations for resource consumer objects as well as applications executed by the resource consumer objects.

Virtualization software can manage the placement and scheduling of resource consumer objects on specific hosts, and allocation of resources from resource pools to resource consumer objects. For example, resource management tools allow resource consumer objects to be moved or migrated to different hosts and resource allocations adjusted to achieve specific objectives and avoid negative conditions. Indeed, a virtualized environment can be highly dynamic with placement of resource consumer objects and allocation of resources frequently changing to adapt according to specific conditions and target objectives.

The fluidity and scale of virtualized environments, while often a virtue, can also create significant management challenges. Numerous variables, such as resource limitations, varying demands, and fluctuations in resource consumption can add multiple levels of complexity and unpredictability to resource management decisions. Not surprisingly, resource management can become a difficult and daunting task, often requiring significant agility and planning to address such evolving demands and conditions. Unfortunately, current resource management solutions lack the necessary agility and forecasting precision needed to match the increasing fluidity and complexity of virtualized environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
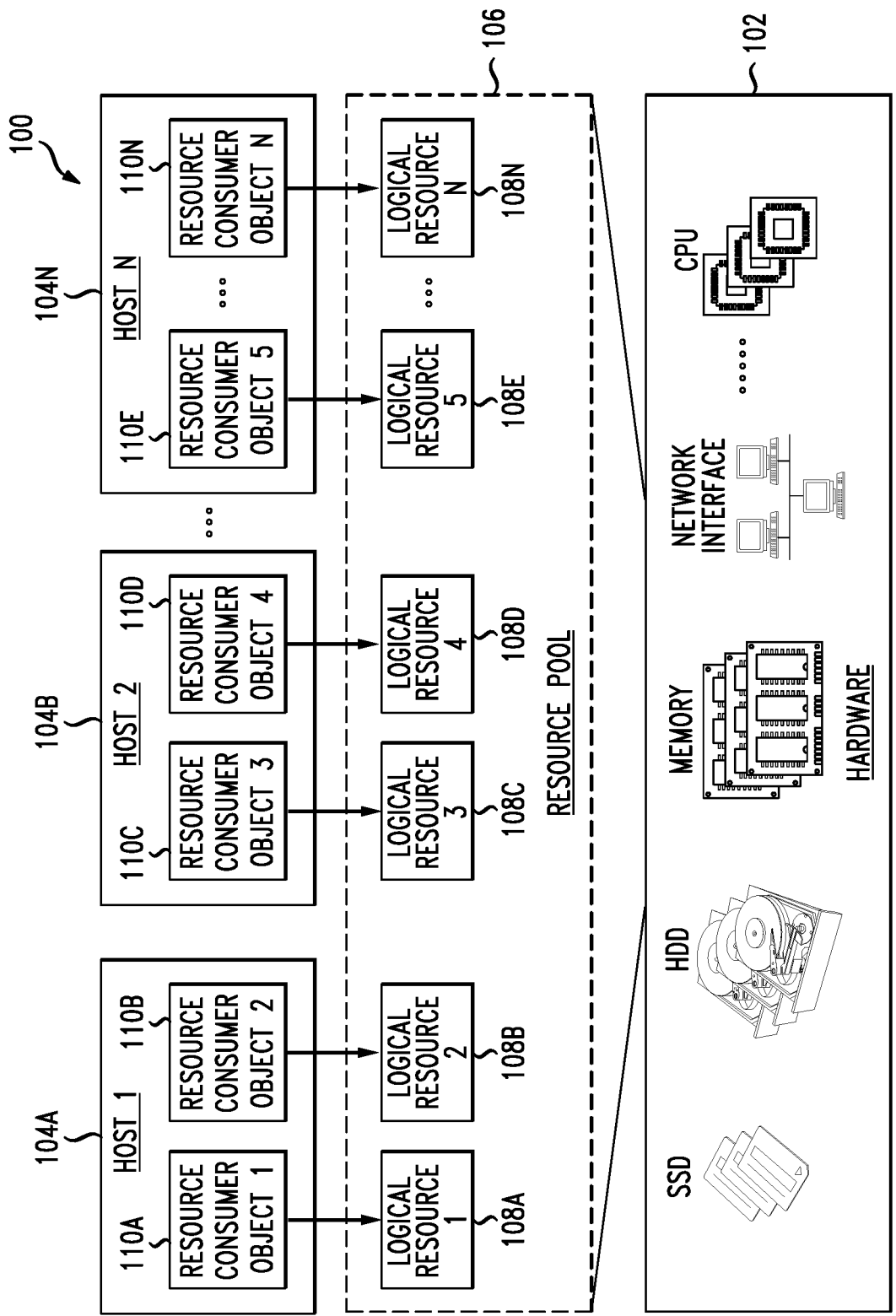
FIGS. 1A-1C illustrate example computing environments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DESCRIPTION

Figure 1B:
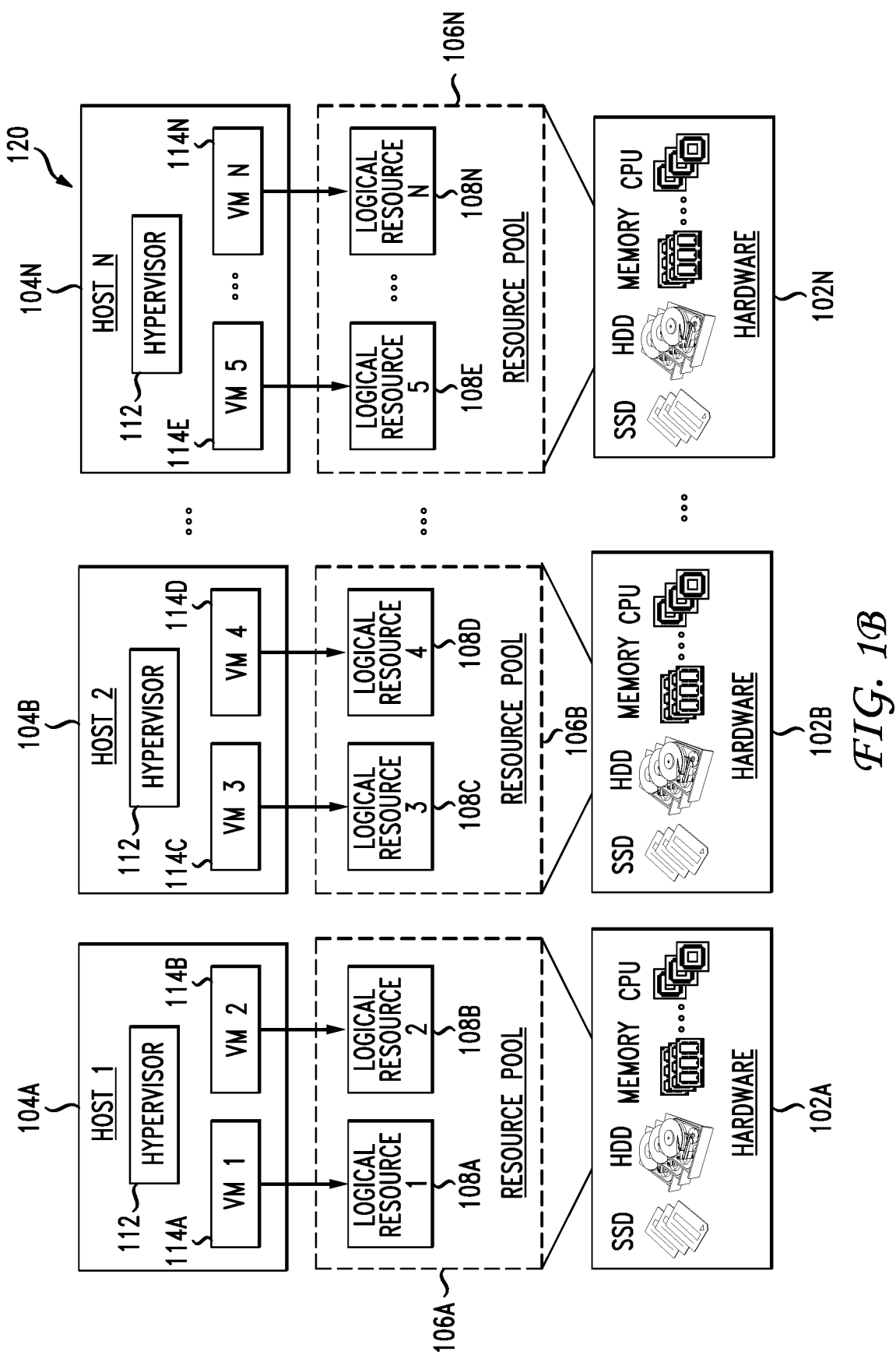
Figure 1C:
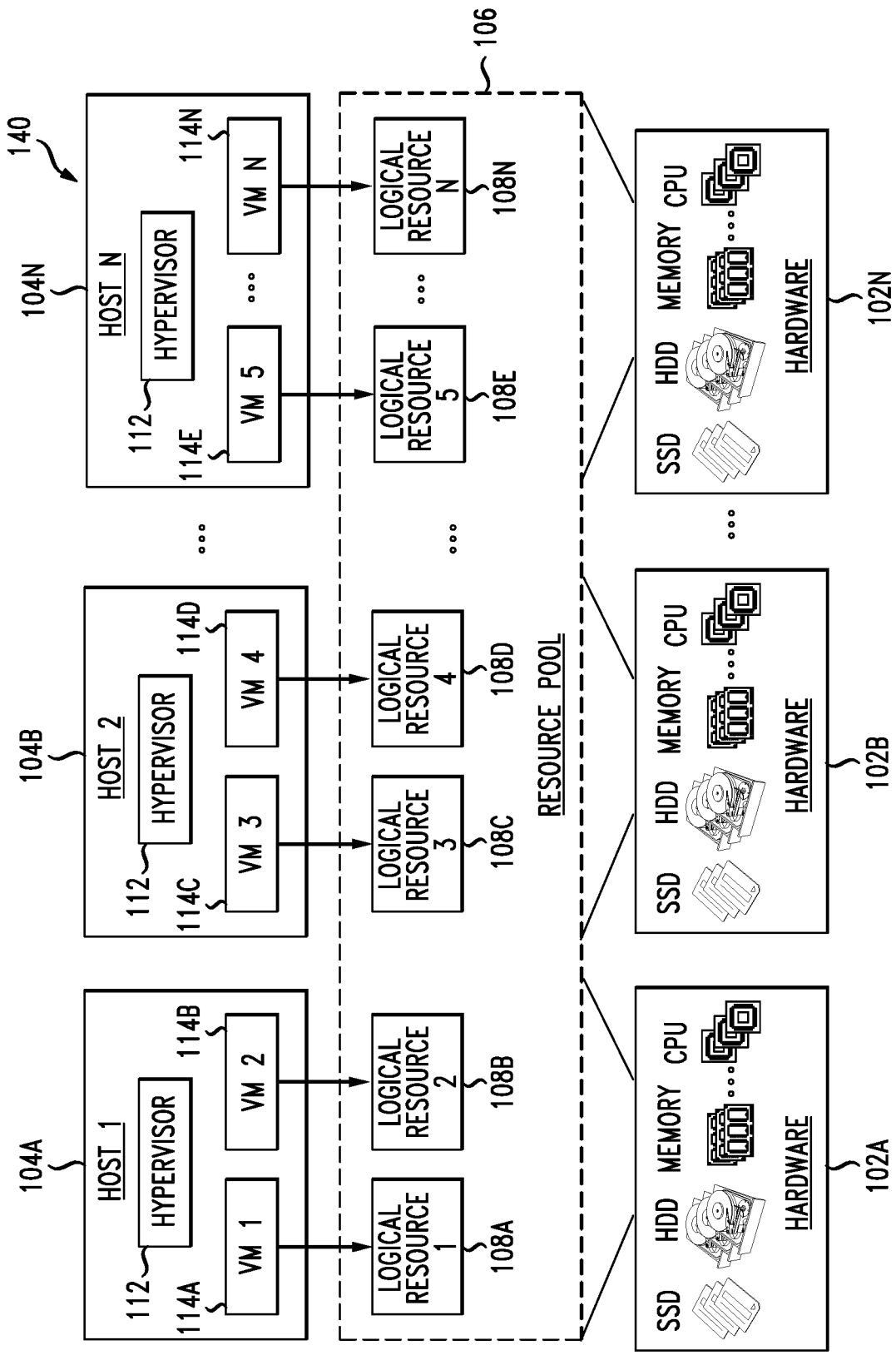

The disclosed technology addresses the need in the art for increasing resource management agility and accuracy in virtualized environments. The present technology involves system, methods, and computer-readable media for accurate and flexible forecasting and management of resource consumption in computing environments. The present technology, including examples and variations, will be described in the following disclosure as follows. The discussion begins with an introductory overview of resource demand prediction, followed by a description of example computing environments, as illustrated in FIGS. 1A-C. A more detailed description of example strategies for forecasting and managing resource consumption in computing environments, as illustrated in FIGS. 2-7, will then follow. The discussion concludes with a description of an example computing device, as illustrated in FIG. 8, including example hardware components suitable for hosting and executing software applications, virtualization software, and computing operations. The disclosure now turns to an introductory overview of resource demand prediction.

Resource demand prediction can include forecasting the resource demands placed on each system component or host in a computing environment. Such forecasting can be used to estimate resource availability on each host and optimize placement of additional resource loads on those hosts. The accuracy of the forecasting predictions can have a significant impact on the performance of the computing environment.

To obtain accurate forecasting calculations, the approaches herein can project or reconstruct a resource consumption history for a host based on the resource consumer objects on the host. The actual, historical resource consumption trend of a host may not always accurately depict the future because the loads or objects hosted by the host can vary over time. Thus, the historical resource consumption data for a host may not reflect resource consumption from some or all of the resource consumer objects currently or more recently on the host. To overcome this discrepancy, the approaches herein can look at current or recent consumer object and host residencies and re-create the historical resource consumption for that host as if the consumer object and host residencies have been the same throughout a period of time. This projection may better reflect the future trends for the host based on the consumer objects on the host.

The resource consumption history constructed for a host can account for workload patterns, such as diurnal and weekly patterns, which are often experienced within a computing environment as the load throughout the day or week can vary in a system. For example, loads can spike at specific time or days and dip at other time or days (e.g., weekends versus weekdays). Thus, the resource consumption history can significantly strengthen the predictive accuracy and flexibility of the current approaches.

The approaches herein can reliably determine and attribute resource consumption in a system where resource consumers migrate from one host to another, and resource allocations or demands can vary. Moreover, the approaches herein can be used to determine long-term (low-frequency) trend in resource demand for each variable over a time period (e.g., a week), and take into account rapid onsets of increased resource demands with high-frequency (e.g., bursts occurring less than one hour ago). The combined steady trend of resource demands can be analyzed while taking into account high-frequency bursts of resource demands.

Having provided an introductory overview of resource demand predictions, the disclosure now turns to FIGS. 1A-C, which illustrate example computing environments for resource demand predictions.

FIG. 1A illustrates a schematic diagram of an example computing environment 100 according to some aspects of the present technologies. The example computing environment 100 can employ virtualization and/or software-defined technologies to decouple physical components from applications, as well as software or virtual infrastructure(s), and provide distributed resources such as storage and compute resources.

The computing environment 100 can include a hardware layer 102, a resource pool 106 with logical resources 108-N (collectively "108" hereinafter), resource consumer objects 110-N (collectively "110" hereinafter) and hosts 104A-N (collectively "104" hereinafter). The hardware layer 102 can represent the underlying, physical devices and components in the computing environment 100. In FIG. 1A, the hardware layer 102 is depicted as a layer of hardware devices. This depiction is a non-limiting example provided for clarity and explanation purposes. It should be understood that the hardware layer 102 is not limited to any particular architecture or topology, or any particular amount or type of systems or hardware. For example, the hardware layer 102 can include one or more servers, hardware devices, layers, datacenters, network devices (e.g., Layer 2 and/or Layer 3 devices), datacenters, storage systems, hardware clusters, networks, infrastructures, and any other computer or hardware system, which can be centralized, distributed or otherwise configured or situated.

Non-limiting examples of hardware in the hardware layer 102 can include memory (e.g., random-access memory), storage (e.g., non-volatile random-access memory such as solid-state drives and flash memory, mechanical drives such as hard disk drives, etc.), processors, interfaces or controllers (e.g., non-volatile memory express, peripheral controller interface express, redundant array of independent disks controllers, etc.), communications interfaces (e.g., network interface cards), video memory, power supplies (e.g., batteries, uninterruptible power supplies, etc.), video hardware (e.g., video cards, dedicated video memory, graphics processor units, etc.), specialized controllers or processors (e.g., baseboard management controller), chips or circuits (e.g., application-specific integrated circuits), cache, etc.

The hardware layer 102 can be adjusted to add or remove hardware devices and resources. For example, servers and hardware components can be added and removed from the hardware layer 102 as desired based on one or more factors such as current and projected conditions and requirements (e.g., performance, failures, workloads, resource status, demands, etc.). Hardware devices and resources can also be replaced as desired. For example, a server can be replaced with a new, upgraded server, a HDD can be replaced with a different HDD, an SSD drive can be swapped with a hot-swappable SSD (e.g., upon failure), and so forth.

The hardware layer 102 can be used to create a resource pool 106. Resource pool 106 can include logical resources 108. Logical resources 108 can include, for example, logical storage (e.g., virtual disks, datastores, etc.), virtual processors, virtual memory, virtual network interfaces, virtual switches, etc. Logical resources 108 can be aggregated from one or more hardware components and/or physical devices. For example, logical resource 108A can include a logical disk that is mapped to one or more hardware storage components (e.g., solid-state drives, hard disk drives, RAIDs, etc.) in the hardware layer 102, which can be hosted in a single system, such as a server, or multiple systems, such as a cluster or datacenter.

Because the logical resources 108 can leverage one or more hardware resources in the hardware layer 102, the logical resources 108 do not have to be constrained by the hardware limitations or capabilities of a specific hardware component or system in the hardware layer 102. This flexibility can provide various benefits. For example, a logical resource can aggregate capabilities from multiple hardware resources in order to extend the capabilities (e.g., capacity, redundancy, performance, etc.) of the logical resource beyond those of the individual hardware resources utilized to generate the logical resource. To illustrate, multiple hardware storage components (e.g., servers, solid-state drives, etc.) from hardware layer 102 can be used to create a logical or virtual disk with greater storage capacity than the individual storage capacity of each of the underlying hardware storage components used to create the logical or virtual disk. In another example, multiple hardware storage components can be used to generate a logical or virtual disk with additional redundancy and/or recovery capabilities. This way, if one or more hardware storage components fail, the logical or virtual disk can continue functioning without downtime or may quickly recover without losing data.

In some examples, storage can be aggregated or combined from multiple storage components in the hardware layer 102, such as solid-state drives (SSDs) or hard disk drives (HDDs), to generate a logical storage resource such as a datastore or virtual disk. Logical resources can also represent and/or correspond to other hardware resources, and/or a combination of different types of hardware resources, in the hardware layer 102. For example, a logical resource can include a logical storage and a logical processor based on hardware storage and processing devices in the hardware layer 102. Moreover, in some cases, a single logical resource can be based on a cluster of hardware resources from hardware layer 102 and/or a cluster of logical resources generated from hardware layer 102.

The logical resources 108 in the resource pool 106 can be modified or reconfigured to adjust one or more logical resource parameters, such as capacity, performance, security, size, settings, hardware mappings, etc. For example, a logical resource can be modified to add or remove one or more of the underlying hardware resources from the hardware layer 102 associated with the logical resource. To illustrate, a hardware storage device, such as an SSD or HDD from hardware layer 102, can be added to a logical resource to extend the logical resource's storage capacity and/or redundancy levels. Moreover, adjustments to the logical resources 108 and/or resource pool 106 can be made dynamically as desired or in response to specific events and conditions.

As previously noted, the computing environment 100 can include hosts 104 for resource consumer objects 110. The resource consumer objects 110 can include, for example, virtual machines, applications, software containers, and/or any workload or software service running on the hosts 104. The hosts 104 can provide the underlying computing platform for the resource consumer objects 110, such as the underlying physical and/or logical platform (e.g., software platform, virtualization platform, etc.). For example, each of the hosts 104 can include a hypervisor (hosted or bare metal), containerization software, a server (physical and/or virtual), an operating system, etc.

The resource consumer objects 110 can be placed or deployed on the hosts 104 and configured to utilize respective logical resources 108 from the resource pool 106. The logical resources 108 in resource pool 106 can be allocated to specific resource consumer objects 110. For example, in FIG. 1A, logical resources 108A-N are respectively allocated to resource consumer objects 110A-N.

To illustrate, logical resource 108A can be a datastore containing one or more virtual disk drives. The datastore can be allocated to resource consumer object 110A. Resource consumer object 110A can thus use the datastore to store data associated with resource consumer object 110A. Resource consumer object 110A can treat or see logical resource 108A as a shared or dedicated storage device. In some cases, logical resource 108A can also include other types of logical resources and/or a cluster of different logical resources. If logical resource 108A includes other logical resources, such as logical memory or processor devices, the other logical resources can also be allocated to resource consumer object 110A. For example, logical resource 108A can include a set of different types of logical devices, such as logical disks and processors, each of which can be allocated to resource consumer object 110A.

In some cases, a single logical resource from the logical resources 108 can be allocated to multiple resource consumer objects 110. For example, a logical resource can be shared or divided between multiple resource consumer objects. Moreover, a resource consumer object can have multiple logical resources allocated to it. For example, resource consumer object 110A can be allocated a datastore from logical resource 108A, and one or more logical processors and/or memory devices from logical resource 108B.

Further, allocations of logical resources 108 to resource consumer objects 110 can be modified or adjusted. For example, the logical resources allocated to resource consumer object 110A can change based on current and/or projected variables and events, such as workloads, performance and capacity requirements, resource and/or application failures, resource consumption trends and/or fluctuations, network conditions, service targets, load balancing decisions, resource consumer deployments, changes in resource allocations, hardware changes, as well as any other parameters and conditions associated with the computing environment 100.

As previously explained, the computing environment 100 can be fluid and experience various changes and events. Resources and consumers in the computing environment 100 can be managed, load balanced, and adjusted to adapt to present and future circumstances in the computing environment 100. Non-limiting examples of changes and adjustments in the computing environment 100 can include migration of resource consumer objects, allocation of logical resources, deployment of new resource consumer objects, termination of resource consumer objects, configuration changes to logical resources 108 and/or resource pool 106, hardware changes, application upgrades and deployments, service adjustments, changes in service objectives, etc.

Strategies for managing resource consumer object placements, logical resource allocations, load balancing decisions, and other adjustments in the computing environment 100 are further described below with reference to FIGS. 2-7.

FIG. 1B illustrates a schematic diagram of another example computing environment, which depicts a virtualized computing environment 120 including virtual machines 114A-N (collectively "114" hereinafter) hosted by hypervisors 112. The virtual machines (VMs) 114 can be resource consumer objects in the virtualized environment 120, such as resource consumer objects 110 in FIG. 1A.

The VMs 114 can be allocated logical resources 108 in the resource pool 106. Unlike the computing environment 100 in FIG. 1A which depicts an aggregated pool of resources, in this example, the resource pool 106 can include multiple resource pools 106A-N, and the VMs 114 can be allocated logical resources 108 from specific resource pools. The resource pools 106A-N can be designated to specific VMs 114 and/or hosts 104 in the virtualized computing environment 120.

Each of the resource pools 106A-N can be based on respective hardware layers 102A-N, so as to form multiple resource pools from the respective hardware layers 102A-N as opposed to a single, aggregated resource pool from a single hardware layer, as illustrated in FIG. 1A or a single, aggregated resource pool from multiple hardware layers, as described below with reference to FIG. 1C.

The respective hardware layers 102A-N can represent the underlying physical layer (e.g., hardware) for the resource pools 106A-N. For example, the respective hardware layers 102A-N can include one or more servers, datacenters, clusters, infrastructures, groups of hardware devices, storage systems, networks, etc., used to create the resource pools 106A-N.

Referring to FIG. 1C, in some examples, the virtualized computing environment 120 can include an aggregated resource pool 106, as opposed to multiple resource pools, based on the hardware layers 102A-N. The logical resources 108 in the resource pool 106 can be generated from a specific hardware layer or may span multiple hardware layers.

Having disclosed example computing environments, the disclosure now turns to a description of technologies for calculating resource consumption data, forecasting resource consumption, and managing resources in computing environments, such as computing environments 100 and 120 shown in FIGS. 1A-C.

Figure 2:
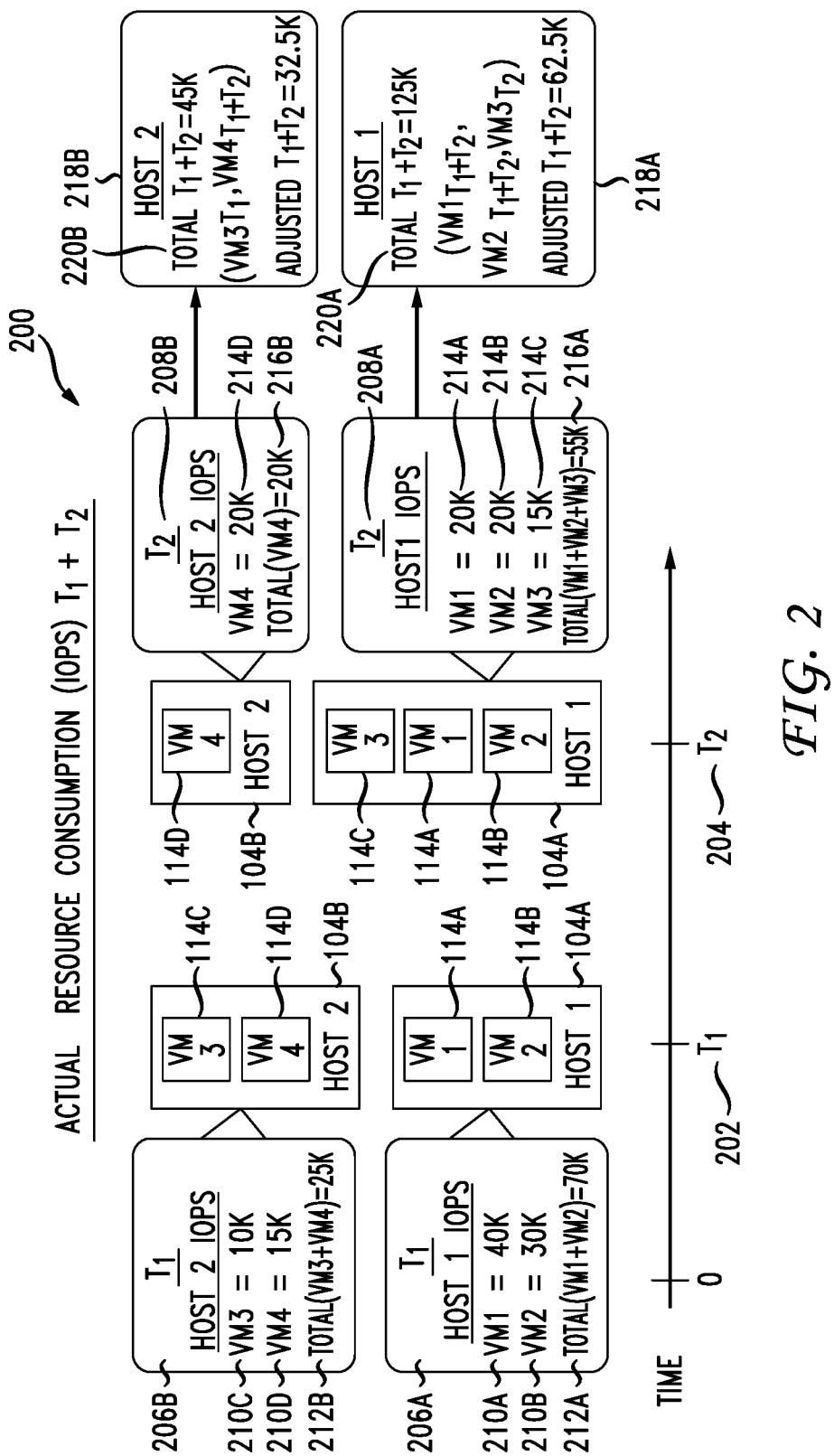
FIG. 2 illustrates an example diagram for calculating actual input/output operations for hosts in a computing environment.
Figure 3:
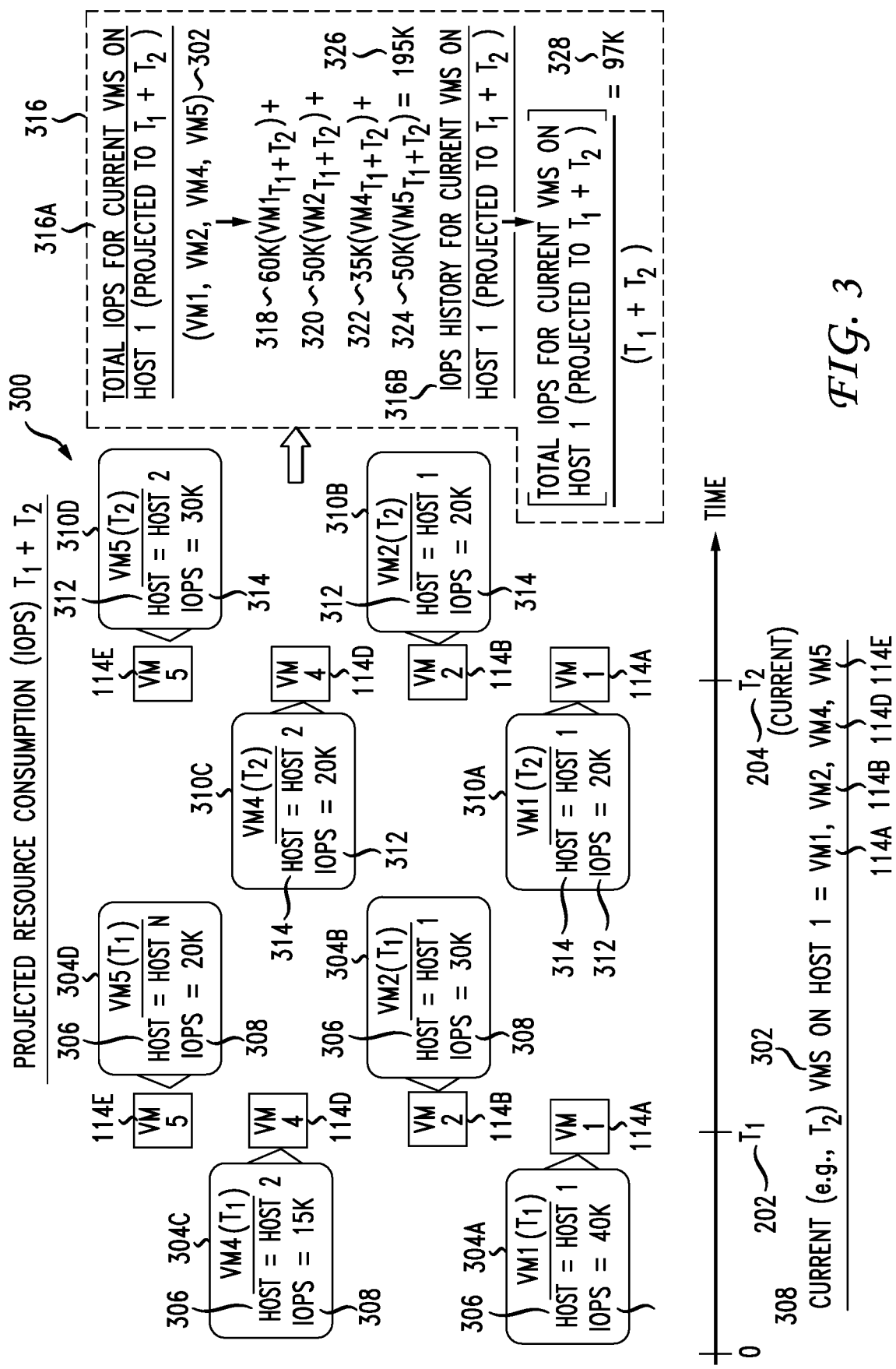
FIG. 3 illustrates an example diagram for calculating a projected input/output operation history for a host in a computing environment.

FIGS. 2 and 3 illustrate example diagrams 200, 300 for calculating resource consumption for hosts over a period of time represented by T1 202 and T2 204. In these examples, the resource consumption attribute calculated is input/output operations per second (IOPS), which is a storage performance measurement and can include, without limitation, read IOPS, write IOPS, total IOPS, and/or any combination thereof. IOPS is used in these examples for illustration purposes, as a non-limiting example attribute for calculating resource consumption. It should be understood that resource consumption calculations can include any other resource consumption attributes or measurements, such as latency, storage capacity, CPU utilization, memory utilization, etc.

Referring to FIG. 2, diagram 200 depicts an example for calculating actual IOPS 218A-B for Host 1 (104A) and Host 2 (104B) over T1 202 and T2 204. As referenced herein, T1 202 and T2 204 can represent any unit or interval of time (e.g., hours, days, weeks, months, etc.).

The actual IOPS 218A for Host 1 (104A) over T1 202 and T2 204 can be calculated by combining the actual IOPS 206A of Host 1 (104A) at T1 202 and the actual IOPS 208A of Host 1 (104A) at T2 204. Similarly, the actual IOPS 218B for Host 2 (104B) over T1 202 and T2 204 can be calculated by combining the actual IOPS 206B of Host 2 (104B) at T1 202 and the actual IOPS 208B of Host 2 (104B) at T2 204. Each of these calculations is further described below.

Actual IOPS of Host 1 and Host 2 at T1

The actual IOPS 206A of Host 1 (104A) at T1 202 can be calculated based on the IOPS of the VMs on Host 1 (104A) at T1 202, and the actual IOPS 206B of Host 2 (104B) at T1 202 can be calculated based on the IOPS of the VMs on Host 2 (104B) at T1 202. Moreover, the actual IOPS 208A of Host 1 (104A) at T2 204 can be calculated based on the IOPS of the VMs on Host 1 (104A) at T2 204, and the actual IOPS 208B of Host 2 (104B) at T2 204 can be calculated based on the IOPS of the VMs on Host 2 (104B) at T2 204.

For example, at T1 202, Host 1 (104A) includes VM 1 (114A) and VM 2 (114B), and Host 2 (104B) includes VM 3 (114C) and VM 4 (110D). Thus, the actual IOPS 206A associated with Host 1 (104A) at T1 202 can be calculated based on IOPS measurement 210A for VM 1 (114A) and IOPS measurement 210B for VM 2 (114B), and the actual IOPS 206B associated with Host 2 (104B) at T1 202 can be calculated based on IOPS measurement 210C for VM 3 (114C) and IOPS measurement 210D for VM 4 (114D).

IOPS measurement 210A for VM 1 (114A) can be combined with IOPS measurement 210B for VM 2 (114B) to obtain the total IOPS measurement 212A for VM 1 (114A) and VM 2 104B, which represents the actual IOPS 206A of Host 1 (104A) at T1 202. In this example, the total IOPS measurement 212A is 70K, which includes 40K from VM 1 (114A) and 30K from VM 2 (114B). Thus, the total IOPS 212A of Host 1 (104A) at T1 202 is 70K. The actual IOPS 206A of Host 1 (104A) at T1 202 can be the 70K from the total IOPS 212A or a summarized value(s) from the total IOPS 212A, such as an average value, for example.

Similarly, the IOPS measurement 210C for VM 3 (114C) can be combined with the IOPS measurement 210D for VM 4 (114D) to obtain the total IOPS measurement 212B for VM 3 (114C) and VM 4 (114D), which represents the actual IOPS 206B of Host 2 (104B) at T1 202. In this example, the total IOPS measurement 212B is 25K, which includes 10K from VM 3 (114C) and 15K from VM 4 (114D). Thus, the total IOPS 212B of Host 2 (104B) at T1 202 is 25K. The actual IOPS 206B of Host 2 (104B) at T1 202 can be the 25K from the total IOPS 212B or a summarized value(s) from the total IOPS 212B.

Actual IOPS of Host 1 and Host 2 at T2

At T2 204, Host 1 (104A) includes VM 1 (114A), VM 2 (114B), and VM 3 (114C), and Host 2 (104B) includes VM 4 (110D). Thus, the actual IOPS 208A of Host 1 (104A) at T2 204 can be calculated based on IOPS measurement 214A for VM 1 (114A), IOPS measurement 214B for VM 2 (114B), and IOPS measurement 214C for VM 3 (114C), which correspond to the IOPS measurements for the VMs in Host 1 (104A) at T2. The actual IOPS 208B associated with Host 2 (104B) at T2 204 can be calculated based on IOPS measurement 214D for VM 4 (114D), which corresponds to the IOPS measurement for the only VM in Host 2 (104B) at T2.

IOPS measurement 214A-C for VM 1 (114A), VM 2 (114B), and VM 3 (114C) can be combined to obtain the total IOPS measurement 216A for VM 1 (114A), VM 2 (114B), and VM 3 (114C). The total IOPS measurement 216A can be used as the actual IOPS 208A of Host 1 (104A) at T2 204, or summarized to obtain the actual IOPS 208A. In this example, the total IOPS measurement 216A is 55K, which includes 20K from VM 1 (114A), 20K from VM 2 (114B), and 15K from VM 3 (114C). Thus, the actual IOPS 208A of Host 1 (104A) at T2 204 can be 55K or a summarized value from 55K, such as an average.

Since VM 4 (114D) is the only VM in Host 2 (104B) at T2 204, the IOPS measurement 214D for VM 4 (114D) can be the total IOPS measurement 216B for Host 2 (104B) at T2 204. The total IOPS measurement 216B represents the actual IOPS 208B of Host 2 (104B) at T2 204. In this example, the IOPS measurement 214D for VM 4 (114D) and the total IOPS measurement 216B are 20K. Thus, the actual IOPS 208B of Host 2 (104B) at T2 204 is 20K.

Actual IOPS of Host 1 and Host 2 over T1 and T2

Having calculated the actual IOPS of Host 1 (104A) and Host 2 (104B) at both T1 202 and T2 204, we can calculate the actual IOPS 218A for Host 1 (104A) over T1 202 and T2 204, and the actual IOPS 218B for Host 2 (104B) over T1 202 and T2 204. The actual IOPS 218A for Host 1 (104A) over T1 202 and T2 204 can be based on the actual IOPS 206A of Host 1 (104A) at T1 202 and the actual IOPS 208A of Host 1 (104A) at T2 204. In this example, the total IOPS 220A for Host 1 (104A) over T1 202 and T2 204 is 125K, which includes 70K corresponding to the actual IOPS 206A of Host 1 (104A) at T1 202 and 55K corresponding to the actual IOPS 208A of Host 1 (104A) at T2 204. The actual IOPS 218A for Host 1 (104A) can be the total IOPS 220A or an adjusted value (e.g., summarized or representative value) from the total IOPS 220A.

The actual IOPS 218B for Host 2 (104B) over T1 202 and T2 204 can be based on the actual IOPS 206B of Host 2 (104B) at T1 202 and the actual IOPS 208B of Host 2 (104B) at T2 204. In this example, the total IOPS 220B for Host 2 (104B) over T1 202 and T2 204 is 45K, which includes 25K corresponding to the actual IOPS 206B of Host 2 (104B) at T1 202 and 20K corresponding to the actual IOPS 208B of Host 2 (104B) at T2 204. The actual IOPS 218B for Host 2 (104B) can be the total IOPS 220B or an adjusted value (e.g., summarized or representative value) from the total IOPS 220B.

Referring to FIG. 3, diagram 300 depicts an example for calculating a projected IOPS history 316 for Host 1 (104A) over T1 202 and T2 204. In this example, T2 204 can represent the present or current time, and T1 202 can represent a previous time. Thus, the difference between T1 202 and T2 204 can represent a time interval between the present or current time T2, and the previous time T1.

The projected IOPS history 316 is calculated based on the current VM configuration 302 at Host 1 (104A). The current VM configuration 302 refers to which VMs are hosted at Host 1 (104A) (i.e., which VMs run or reside in Host 1 (104A) at T2). In diagram 300, the VMs at Host 1 (104A) are VM 1 (114A), VM 2 (114B), VM 4 (114D), and VM 5 (114E). Accordingly, the current VM configuration 302 includes VM 1 (114A), VM 2 (114B), VM 4 (114D), and VM 5 (114E).

The current VM configuration 302 associated with Host 1 (104A) can be used to determine the projected IOPS history 316 for Host 1 (104A) over T1 202 and T2 204 by calculating and combining the IOPS of each of VM 1 (114A), VM 2 (114B), VM 4 (114D), and VM 5 (114E) at T1 202 and T2 204. The total IOPS of VM 1 (114A), VM 2 (114B), VM 4 (114D), and VM 5 (114E) at T1 202 and T2 204 can represent the projected IOPS history 316 for host 1 104A over T1 202 and T2 204, or may be used to calculate one or more adjusted values that are representative of the projected IOPS history 316.

It should be noted that the VMs currently hosted at Host 1 (104A) can differ from the VMs on Host 1 (104A) at T1 202. Thus, since the projected IOPS history 316 is calculated based on the current VM configuration 302, which reflects the VMs in Host 1 (104A) at T2 204 (i.e., the current VMs in Host 1 (104A)), the projected IOPS history 316 can differ from the actual IOPS of Host 1 (104A) over T1 202 and T2 204 (e.g., the actual IOPS 218A calculated in FIG. 2). However, by calculating the projected IOPS history 316 based on the current VM configuration 302 of Host 1 (104A), we can project the current VM composition at Host 1 (104A) to each interval (e.g., T1 202) in the desired time period calculated (i.e., T1 202 and T2 204), to model or construct an IOPS for Host 1 (104A) over the desired time period that assumes the current VM composition at Host 1 (104A) at each interval in the desired time period. This way, the projected IOPS history 316 can provide a deconstructed and re-constructed history, which recreates the historical IOPS of Host 1 (104A) over the desired time period as if the current VM composition at Host 1 (104A) had been the VM composition at Host 1 (104A) throughout the desired time period.

Accordingly, the projected IOPS history 316 can provide a virtual historical trend and/or measurement that is based on the current VM composition at Host 1 (104A). The projected IOPS can be used to predict, with great precision, the future IOPS for Host 1 (104A), as it can project a future IOPS for Host 1 (104A) that more accurately reflects the current VM composition at Host 1 (104A).

The projected IOPS history 316 can be calculated based on statistics 304A-D collected for VM 1 (114A), VM 2 (114B), VM 4 (114D), and VM 5 (114E) at T1 202, and statistics 310A-D for VM 1 (114A), VM 2 (114B), VM 4 (114D), and VM 5 (114E) at T2 204. The statistics 304A-D and 310A-D can include host information 306, 312, and IOPS measurements 308, 314 for VM 1 (114A), VM 2 (114B), VM 4 (114D), and VM 5 (114E) at T1 202 and T2 204.

For example, the host information 306 in the statistics 304A-D indicate that VM 1 (114A) and VM 2 (114B) were hosted by Host 1 (104A) at T1 202, while VM 4 (114D) and VM 5 (114E) were hosted respectively by Host 2 (104B) and hostN 104N at T1 202. In addition, IOPS measurements 308 in the statistics 304A-D indicate that, at T1 202, IOPS for VM 1 (114A) was 40K, IOPS for VM 2 (114B) was 30K, IOPS for VM 4 (114D) was 15K, and IOPS for VM 5 (114E) was 20K. Thus, VM 1 (114A), VM 2 (114B), VM 4 (114D), and VM 5 (114E) have a combined IOPS of 105K at T1 202.

Further, the host information 312 in the statistics 310A-D indicate that VM 1 (114A) and VM 2 (114B) were hosted by Host 1 (104A) at T2 204, and VM 4 (114D) and VM 5 (114E) were hosted by Host 2 (104B) at T2 204. The IOPS measurements 314 in the statistics 310A-D indicate that, at T2 204, IOPS for VM 1 (114A) was 20K, IOPS for VM 2 (114B) was 20K, IOPS for VM 4 (114D) was 20K, and IOPS for VM 5 (114E) was 30K. Thus, VM 1 (114A), VM 2 (114B), VM 4 (114D), and VM 5 (114E) have a combined IOPS of 90K at T2 204.

The IOPS measurements 308, 314 at T1 202 and T2 204 for VM 1 (114A), VM 2 (114B), VM 4 (114D), and VM 5 (114E) can be used to calculate the projected IOPS history 316. For example, the IOPS measurements 308, 314 can be used to calculate the IOPS 318 for VM 1 (114A) at T1 202 and T2 204, the IOPS 320 for VM 2 (114B) at T1 202 and T2 204, the IOPS 322 for VM 4 (114D) at T1 202 and T2 204, and the IOPS 324 for VM 5 (114E) at T1 202 and T2 204. The IOPS measurements 318, 320, 322, 324 can be used to determine a total IOPS measurement 316A representing the IOPS associated with VM 1 (114A), VM 2 (114B), VM 4 (114D), and VM 5 (114E) at T1 202 and T2 204. In some cases, the total IOPS measurement 316A can represent the projected IOPS history 316. In other cases, the total IOPS measurement 316A can be used to calculate an IOPS history 316B that is summarized or adjusted, such as an average of the total IOPS measurement 316A. Whether the total IOPS measurement 316A is used as the projected IOPS history 316 can depend on one or more factors, such as specific attributes being measured (e.g., CPU utilization ratio versus total storage capacity), calculation goals or objectives, etc.

To illustrate, the IOPS measurement 318 for VM 1 (114A) at T1 and T2 204 can be 60K, the IOPS measurement 320 for VM 2 (114B) at T1 and T2 204 can be 50K, the IOPS measurement 322 for VM 4 (114D) at T1 and T2 204 can be 35K, and the IOPS measurement 324 for VM 5 (114E) at T1 and T2 204 can be 50K. The total IOPS measurement 316A can thus be 195K (326), which includes IOPS measurements 318, 320, 322, 324. Thus, in some cases, the projected IOPS history 316 can be 195K, which corresponds to the total IOPS measurement 316A. In other cases, the total IOPS measurement 316A can be used to generate an IOPS history 316B which can be a summarization or representation of IOPS based on the total IOPS measurement 316A.

Figure 4:
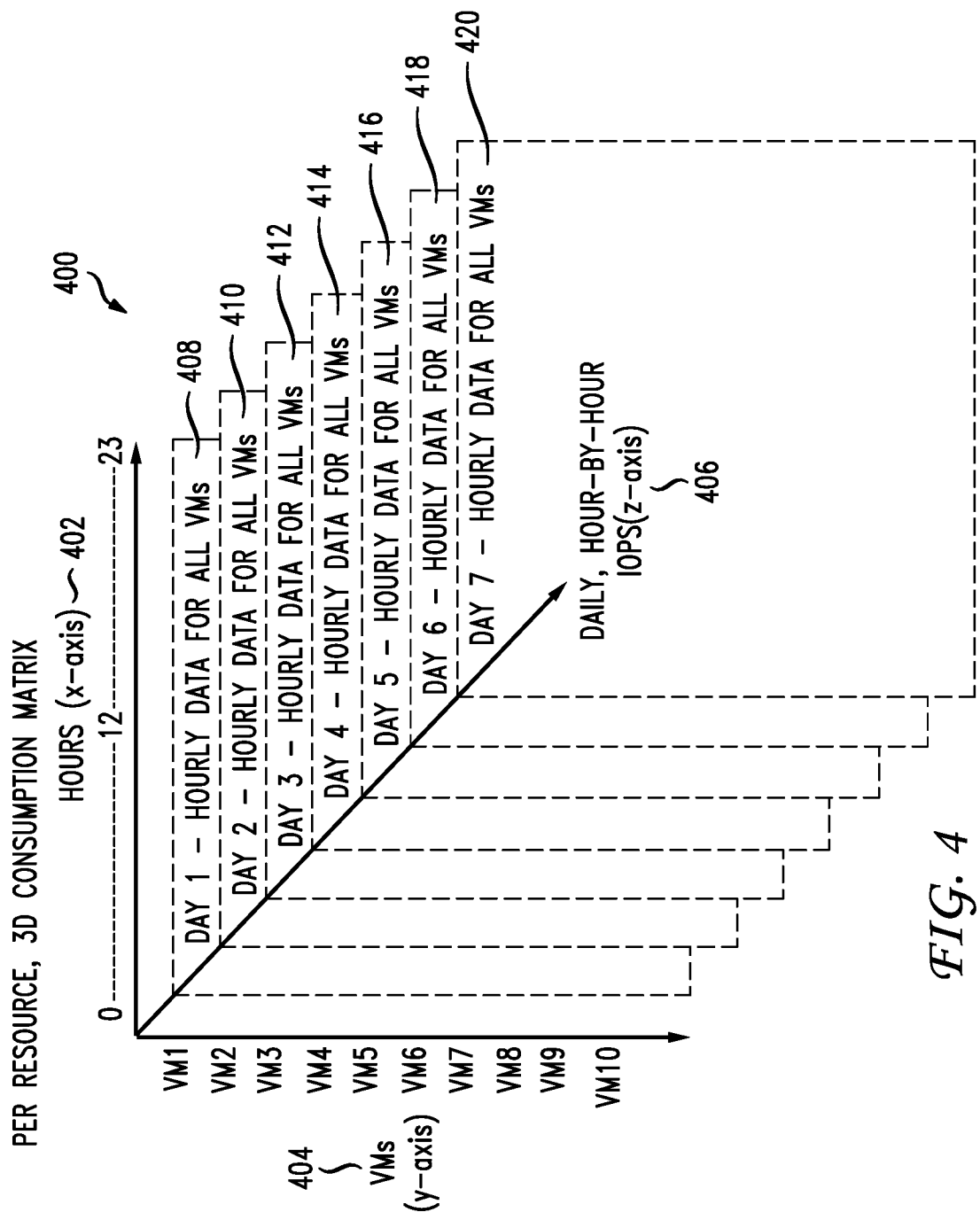
FIG. 4 illustrates an example matrix containing resource consumption data.

FIG. 4 illustrates an example per-resource, 3D consumption matrix 400 for a host. The matrix 400 can represent resource consumption data over a period of time for each resource consumption object currently at a host. Thus, the matrix 400 can represent resource consumption over time for each resource consumer object currently on a host, even if one or more of the resource consumer objects have not resided at the host during the entire period of time. The data in the matrix 400 can be used to project a resource consumption history for a host, where the projected resource consumption history represents resource consumption of the resource consumer objects currently on the host.

The matrix 400 includes an x-axis 402, which represents time intervals according to a first unit of time (e.g., hours), a y-axis 404 which represents resource consumer objects (e.g., VMs 1-10) on a host, and a z-axis 406 which represents time intervals according to a second unit of time (e.g., days). The values in the matrix 400 can represent resource consumption data (e.g., IOPS) for the resource consumer objects in the y-axis 404 at the various time intervals in the x-axis 402 and z-axis 406.

In the example depicted in FIG. 4, the matrix 400 includes daily, hour-by-hour IOPS data 408, 410, 412, 414, 416, 418, 420 for all VMs (e.g., VMs 1-10) on a host, over a particular period of time (e.g., 7 days or a week).

For example:
IOPS data 408 includes hourly IOPS data in day 1 for VMs 1-10;
IOPS data 410 includes hourly IOPS data in day 2 for VMs 1-10;
IOPS data 412 includes hourly IOPS data in day 3 for VMs 1-10;
IOPS data 414 includes hourly IOPS data in day 4 for VMs 1-10;
IOPS data 416 includes hourly IOPS data in day 5 for VMs 1-10;
IOPS data 418 includes hourly IOPS data in day 6 for VMs 1-10; and
IOPS data 420 includes hourly IOPS data in day 7 for VMs 1-10.

The IOPS data 408, 410, 412, 414, 416, 418, 420 includes raw data, such as IOPS values measured for VMs 1-10. IOPS values can include a value for write IOPS, a value for read IOPS, a value for total IOPS, or any other IOPS values and/or combination of IOPS values. The IOPS data 408, 410, 412, 414, 416, 418, 420 can also be analyzed, summarized, interpreted, modeled, etc. For example, IOPS data can be summarized for each VM to obtain a summary or interpretation of IOPS for each VM, all VMs, each day, etc. The IOPS data can be summarized based on an average, a median, a percentile, a minimum, a maximum, etc.

For example, in some cases, the IOPS data can be converted into a consumption array by sorting values and taking the $90^{th}$ percentile of the hourly values for each VM. The consumption summary array can contain one or more values to describe IOPS use for each VM, such as write IOPS, read IOPS, total IOPS, etc. As another example, the IOPS data can be used to generate an average daily consumption for each VM, an average daily consumption for all VMs, a total average consumption over a period of time (e.g., 7 days) for each VM, a total average consumption over a period of time (e.g., 7 days) for all VMs, etc.

The summarized data can also be combined or analyzed with instantaneous data (e.g., current or live measurements) to calculate a representative value. For example, summarized hourly IOPS data for each VM and instantaneous data for each VM can be used to calculate IOPS values for each VM. In some cases, the summarized hourly IOPS data can be compared with the instantaneous data to identify a representative value or range. For example, the representative value can be selected from the lower or greater value from the summarized hourly IOPS value and the instantaneous value.

The data in matrix 400, as well as any summarized, instantaneous, representative, and/or calculated data can be stored and analyzed to perform resource management and forecasting calculations for resource placement and load balancing decisions.

Figure 5:
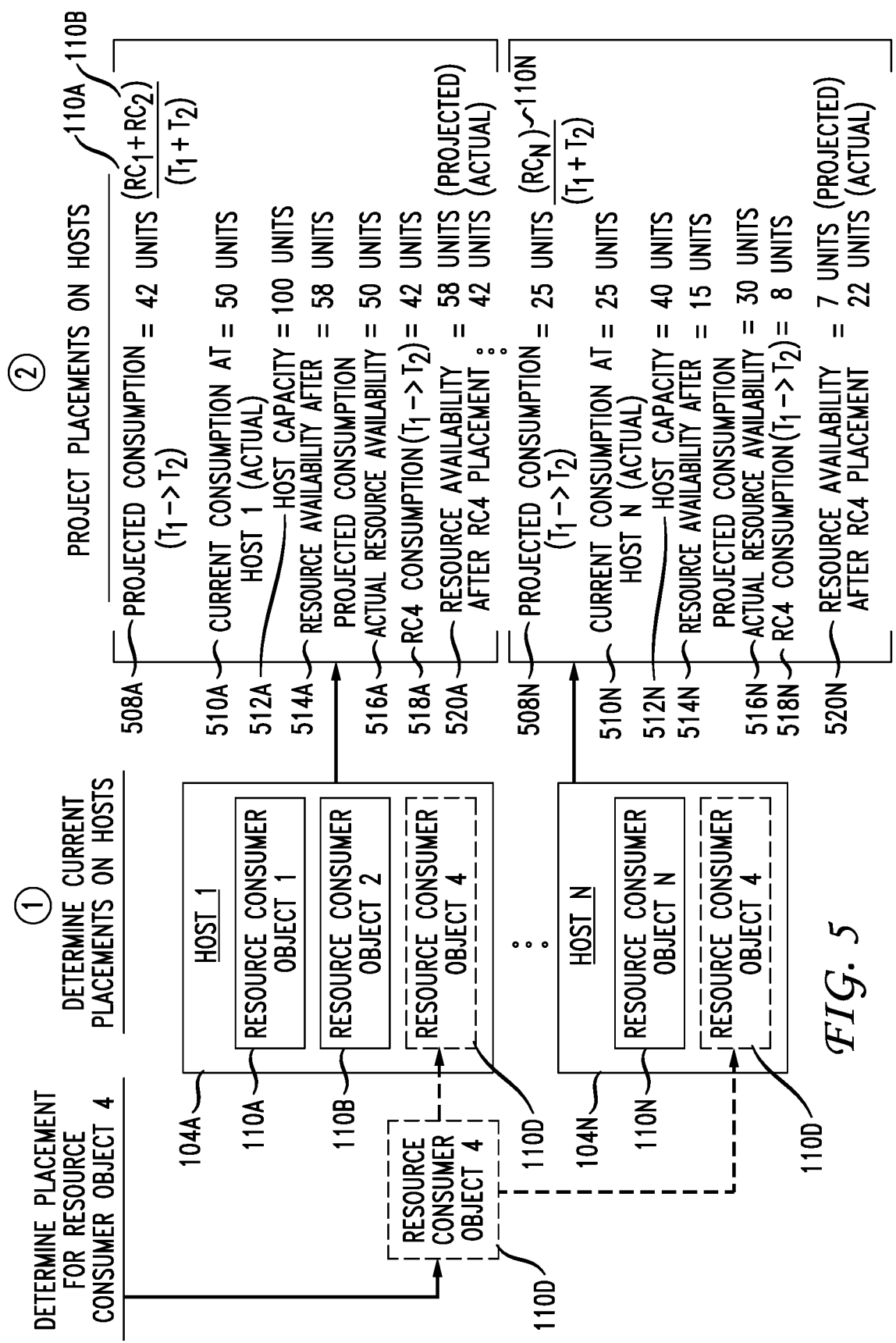
FIG. 5 illustrates an example diagram for resource management and forecasting calculations to determine placements in a computing environment.

FIG. 5 illustrates a diagram of example resource management and forecasting calculations for determining a placement in a computing environment (e.g., computing environments 100 or 120) for Resource Consumer Object 4 (110D). The placement determination can be part of load balancing or resource management efforts in a computing environment.

Placement determinations can be performed when deploying new resource consumer objects, modifying host configurations, modifying resource allocations, modifying existing resource consumer object placements (e.g., copying, moving/migrating, extending, mirroring, restoring, backing up, or synchronizing a resource consumer object to a host), etc. Placement determinations can involve selecting a host for a resource consumer object and/or selecting one or more logical resources for a resource consumer object or a host of resource consumer objects.

The diagram in FIG. 5 illustrates a placement calculation for Resource Consumer Object 4 (110D). The placement involves selecting a host from the hosts 104 in the computing environment 100 for Resource Consumer Object 4 (110D). Resource consumer object4 110D may or may not have an existing host. For example, Resource Consumer Object 4 (110D) can be a new resource consumer object being deployed in the computing environment 100, or an existing resource consumer object being copied, moved/migrated, extended, mirrored, restored, backed up, synchronized, etc., from a host to another host. If Resource Consumer Object 4 (110D) is a new resource consumer object being deployed, the placement determination will involve selecting a host to deploy Resource Consumer Object 4 (110D). If Resource Consumer Object 4 (110D) is an existing resource consumer object, the placement determination can involve selecting a new host for the Resource Consumer Object 4 (110D) and/or determining whether the current placement of the Resource Consumer Object 4 (110D) should be adjusted (e.g., should Resource Consumer Object 4 (110D) be migrated to a different host).

Resource consumer object4 110D can be deployed on any of the hosts 104A through 104N in computing environment 100. To select a specific host for Resource Consumer Object 4 (110D), we first determine the current resource consumer object placements on the hosts 104A through 104N in computing environment 100. In other words, we identify the resource consumer objects on each of the hosts 104A through 104N. In FIG. 5, Host 1 (104A) hosts Resource Consumer Object 1 (110A) and Resource Consumer Object 2 (110B), and Host N 104N hosts Resource Consumer Object N (110N).

Based on the current resource consumer object placements on the hosts 104A through 104N, we calculate placement of resource consumer object data for each host. The placement of resource consumer object data can include a projected consumption history for the host, a current consumption for the host, a host capacity, a resource availability at the host in view of the projected consumption history, a resource availability at the host based on the current consumption, a consumption estimate for Resource Consumer Object 4 (110D), and a resource availability at the host after placement of Resource Consumer Object 4 (110D).

The projected consumption history for the host can be calculated based on a resource consumption calculated for the current resource consumer objects on that host over a period of time. Moreover, the resource availability after placement of Resource Consumer Object 4 (110D) can be calculated based on the projected consumption history and/or the current consumption. Example calculations of placement of resource consumer object data for Hosts 1 (104A) and Host N (104N), as shown in FIG. 5, are further described below.

Host 1 Placement of Resource Consumer Object Data

Projected consumption history 508A can be constructed for Host 1 (104A) based on resource consumption over a period of time (e.g., T1 to T2) calculated for the resource consumer objects 110A-B currently at Host 1 (104A). For example, a resource consumption calculated for Resource Consumer Object 1 (110A) can be combined with a resource consumption calculated for Resource Consumer Object 2 (110B) to determine a projected consumption history 508A.

The actual consumption 510A can be the current resource consumption measured at Host 1 (104A). In some cases, the actual consumption 510A can also, or otherwise, be the actual or measured resource consumption of Host 1 (104A) over a period of time. Thus, the actual consumption 510A can be the actual, measured consumption in the present but can also be the actual, measured consumption over a period of time. An actual consumption measured for a period of time can, in some cases, differ from the projected consumption history for that same period of time because the actual consumption is based on the actual resource consumer placements at the host over the period of time, while the projected consumption history is specific to the current resource consumer placements at the host. This is because resource consumer placements at the host can change over the period of time, so the current resource consumer placements may not be the same as the actual resource consumer placements.

The host capacity 512A can be the actual capacity of Host 1 (104A) for one or more consumption attributes, such as IOPS, latency, CPU, memory, network, etc. The projected availability 514A (e.g., availability based on the projected consumption) can be the host capacity 512A minus the projected consumption 508A. The actual availability 514A can be the host capacity 512A minus the actual consumption 510A.

In some cases, the placement of resource consumer object data can include estimated consumption 518A for Resource Consumer Object 4 (110D). Estimated consumption 518A can be a consumption calculated for the Resource Consumer Object 4 (110D) based on actual consumption data about the Resource Consumer Object 4 (110D) (if Resource Consumer Object 4 (110D) is an existing resource consumer object) or a resource consumption prediction based on one or more characteristics about the resource, such as applications, loads, resource demands, service requirements, etc. In some cases, the estimated consumption 518A may not be available or may be only optionally calculated. For example, in some cases, Resource Consumer Object 4 (110D) may be a new deployment without existing consumption data. Here, the estimated consumption 518A may be omitted or may only provide a general estimate.

In some cases, the placement of resource consumer object data can also include a resource availability estimate 520A for the host calculated to account for the estimated consumption 518A for Resource Consumer Object 4 (110D). The resource availability estimate 520A can include a projected and/or actual resource availability estimate. The projected resource availability estimate can be calculated by reducing the projected resource availability 514A by the estimated consumption 518A. The actual resource availability estimate can be calculated by reducing the actual resource availability 516A by the estimated consumption 518A.

Host N Placement of Resource Consumer Object Data

Projected consumption history 508N can be constructed for Host N (104N) based on resource consumption over a period of time (e.g., T1 to T2) calculated for the Resource Consumer Object N (110N) currently at Host N (104N). Since resource consumer object 110N is the only resource consumer object at Host N (104N), then the projected consumption history 508N will be limited to a consumption history of resource consumer object 110N over the period of time. If the resource consumer object 110N resided in a different host at any time during the period of time, the resource consumption of resource consumer object 110N while at the different host will be included in the projected consumption history 508N, since the projection plots the resource consumption of the current resource consumption objects over the period of time as opposed to the actual historical consumption of the host over the period of time.

The actual consumption 510N can be the current resource consumption measured at Host N (104N). Thus, the actual consumption 510N will only include the resource consumption of one resource consumer object: resource consumer object 110N.

The host capacity 512N can be the actual capacity of Host N (104N) for the one or more consumption attributes selected for consideration. The projected resource availability 514N (e.g., resource availability based on the projected consumption) can be the host capacity 512N minus the projected consumption 508N. The actual resource availability 514N can be the host capacity 512N minus the actual consumption 510N.

As previously mentioned, in some cases, the placement of resource consumer object data can include an estimated consumption 518 for Resource Consumer Object 4 (110D). If the placement of resource consumer object data includes an estimated consumption 518, the estimated consumption 518 can be used to calculate a resource availability estimate 520N at the host, which is calculated to account for the estimated consumption 518 for Resource Consumer Object 4 (110D). The resource availability estimate 520N can include a projected and/or actual resource availability estimate. The projected resource availability estimate can be calculated by reducing the projected resource availability 514N by the estimated consumption 518, and the actual resource availability estimate can be calculated by reducing the actual resource availability 516N by the estimated consumption 518.

The placement of resource consumer object data for Host 1 (104A) through Host N (104N) can be used to make placement determinations for the Resource Consumer Object 4 (110D). For example, a host can be selected based on a comparison or review of the respective projected consumption histories (e.g., projected consumption history 508A through 508N), actual consumptions 510A through 510N, projected resource availabilities 514A through 514N, actual resource availabilities 516A through 516N, estimated resource availabilities 520A through 520N, etc.

Figure 6A:
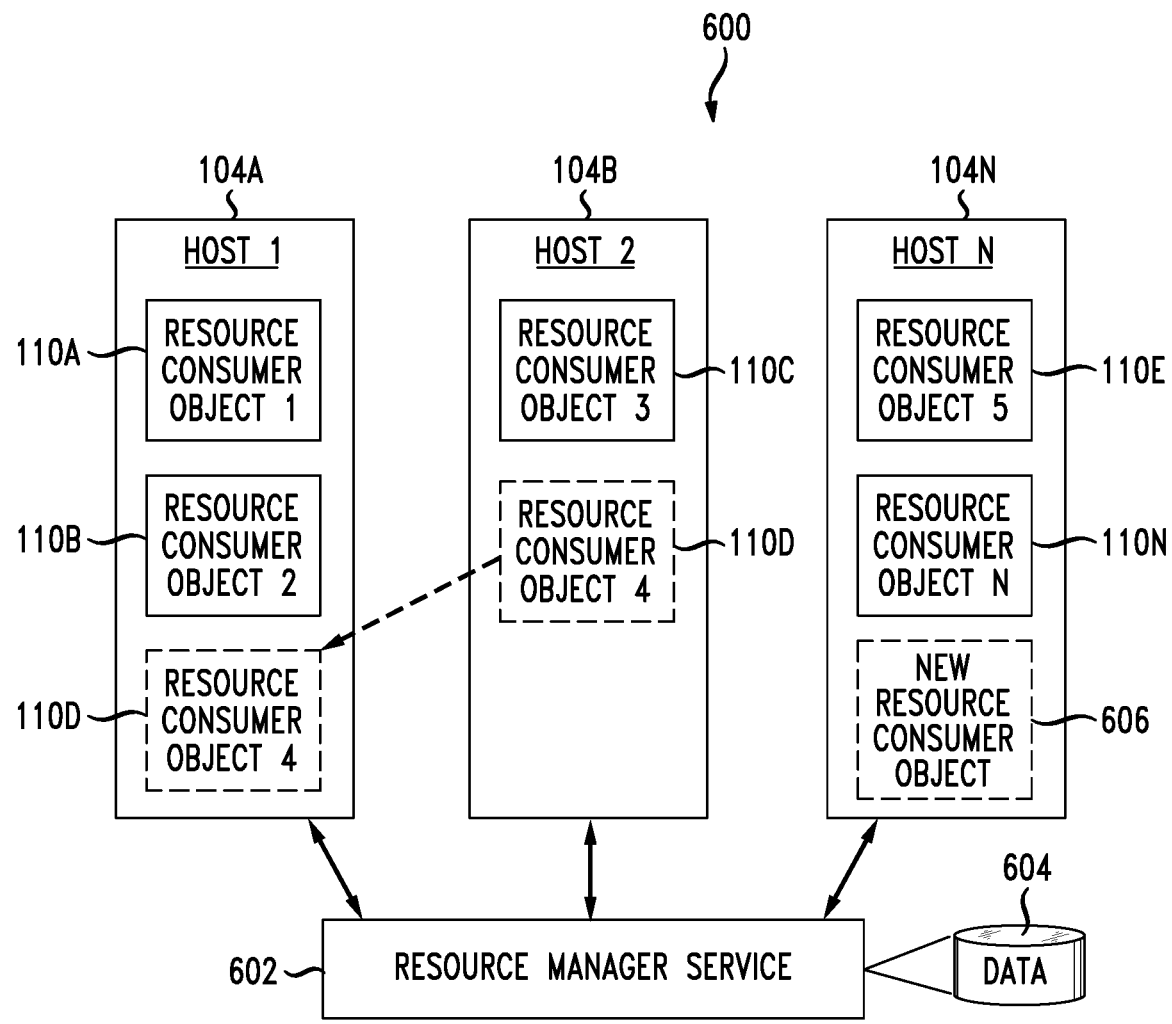
FIGS. 6A-6B illustrate example diagrams for resource consumer placements and resource allocations.

FIG. 6A illustrates a diagram of resource consumer placements 600 in a computing environment (e.g., computing environment 100). Resource consumer placements and determinations can be managed by a resource manager service 602. Resource manager service 602 can include one or more applications for collecting resource consumption data, calculating resource consumption and placement of resource consumer object data, projecting resource consumption histories for hosts, forecasting resource consumption, monitoring resource consumer objects and hosts, load balancing resources and placements, orchestrating deployments and migrations, allocating resources to hosts and resource consumer objects, etc.

Resource manager service 602 can be hosted on one or more servers, datacenters, computing devices, etc. For example, resource manager service 602 can be a software container or virtual machine on a physical server. In some cases, resource manager service 602 can be implemented as a cloud service.

Resource manager service 602 can collect and store data 604, such as placement of resource consumer object data and consumption statistics, for performing resource consumer placement and resource allocation determinations. Resource manager service 602 can monitor hosts, resources, and resource consumer objects in the computing environment and obtain respective measurements and statistics. Resource manager service 602 can also manage logical resources, including creating logical resources, adjusting logical resources, configuring logical resources, allocating logical resources, etc.

Resource manager service 602 can communicate with hosts, resource consumer objects, logical resources, hardware resources, and any other element in the computing environment as necessary to perform resource management services as previously described. For example, resource manager service 602 can communicate with the hardware layer 102 to manage communication and/or configuration of logical resources (e.g., create logical resources, aggregate resources, etc.), as well as hosts and resource consumer objects to perform load balancing and resource consumer placement decisions.

Resource manager service 602 can migrate and deploy resource consumer objects in the computing environment. For example, resource manager service 602 can migrate Resource Consumer Object 4 (110D) from Host 2 (104B) to Host 1 (104A). This migration can be based on placement of resource consumer object data, including a projected resource consumption history calculated for Host 1 (104A), Host 2 (104B), and/or Host N (104N). Resource consumer object4 110D can be migrated dynamically to optimize placements, improve objectives, adapt to current or future circumstances (e.g., workload fluctuations, resource availability changes, hardware changes, changing requirements or demands, growth, upgrades, failures, network events, etc.), prevent a failure, load balance, etc.

As another example, resource manager service 602 can deploy a new resource consumer object 606 on Host N (104N). The host for deploying the new resource consumer object 606 can be selected based on resource and placement of resource consumer object data and calculations, as previously explained.

Resource manager service 602 can continue to monitor and dynamically identify and manage resource consumer object placements, such as VM data placements, to actively optimize the computing environment and adapt to current and future circumstances. In a large and fluid environment, this can involve numerous placements, deployments, and fast-pace adjustments, which can be accurately driven by projected resource consumption histories constructed for hosts, as well as actual resource consumption and demands.

Figure 6B:
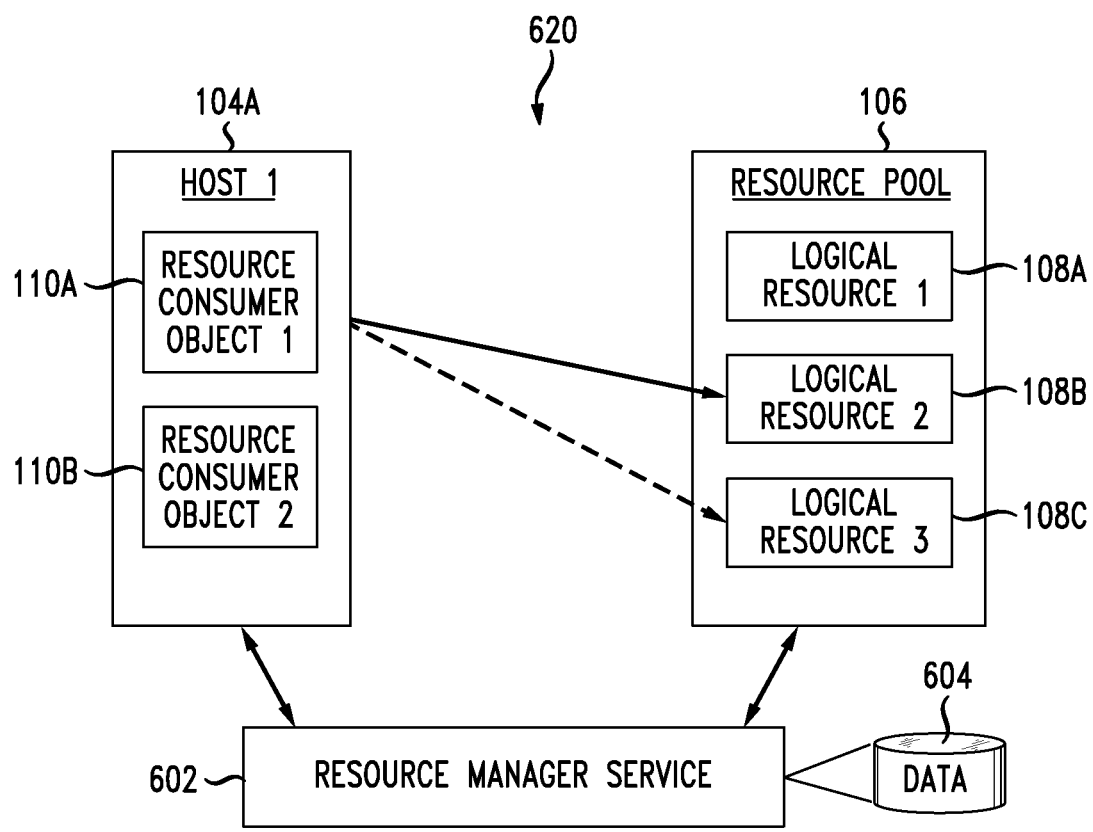

FIG. 6B illustrates a diagram of logical resource allocations 620 in a computing environment (e.g., computing environment 100 or 120). Resource manager service 602 can allocate logical resources from resource pool 106 and adjust logical resource allocations. In this example, logical resource 108B in the resource pool 106 is allocated to Host 1 (104A). Logical resource 108B can service Host 1 (104A), including Resource Consumer Object 1 (110A) and/or Resource Consumer Object 2 (110B).

Resource manager service 602 can allocate logical resource 108C to Host 1 (104A) and/or one or more of its resource consumer objects. Resource manager service 602 can allocate logical resource 108C in addition to logical resource 108B to increase the amount of logical resources for Host 1 (104A), or replace logical resource 108B with logical resource 108C to adjust how or which logical resources are allocated.

Resource manager service 602 can allocate logical resource 108C based on a projected consumption history constructed for Host 1 (104A) and any other hosts, as well as other placement and consumption data, such as actual consumption or demand data. Moreover, resource manager service 602 can allocate and re-allocate resources in addition to, or in lieu of, adjusting placements of resource consumer objects, as part of load balancing and resource management efforts.

Figure 7:
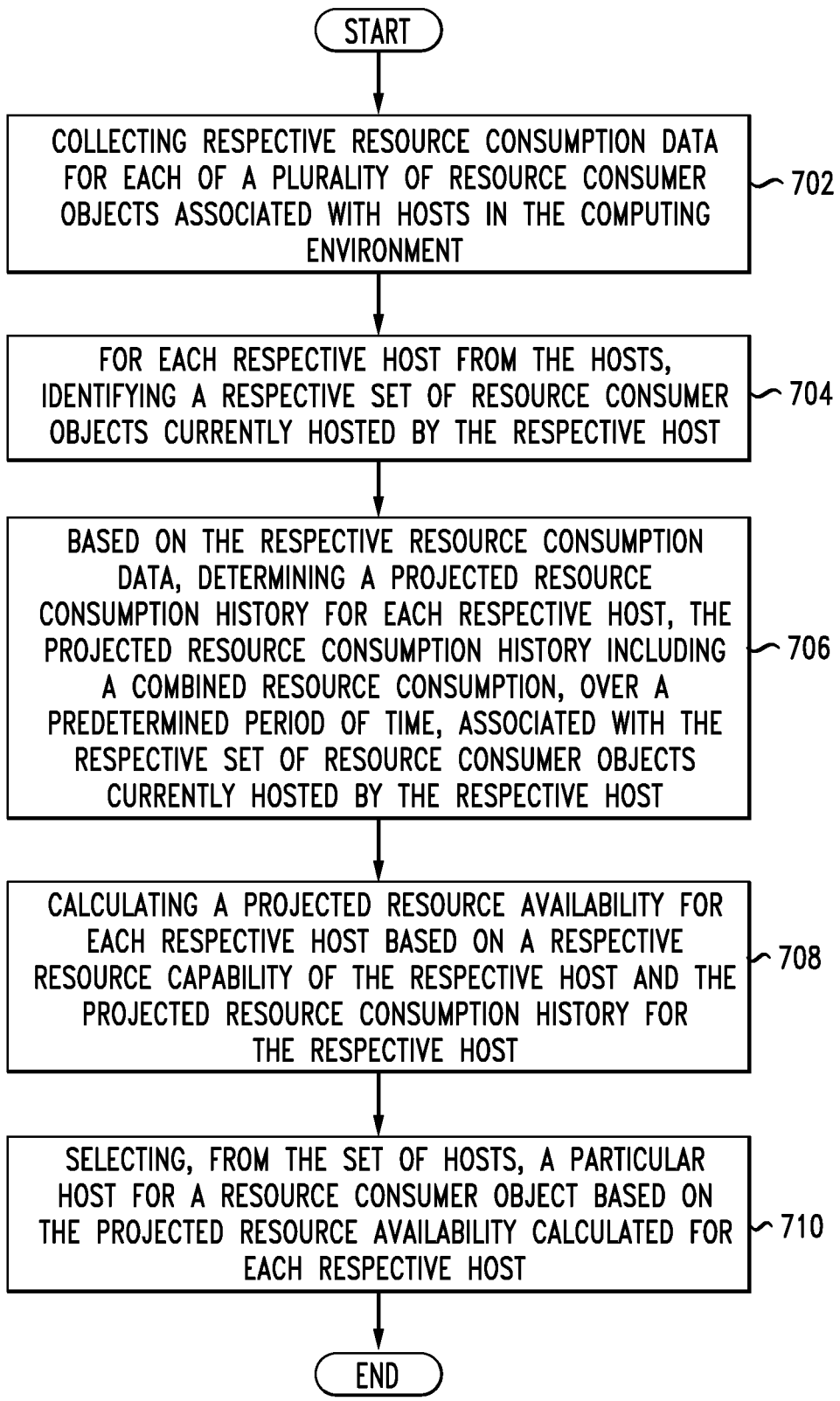
FIG. 7 illustrates an example method for predicting resource demands and managing resources and placements in a computing environment.
Figure 8:
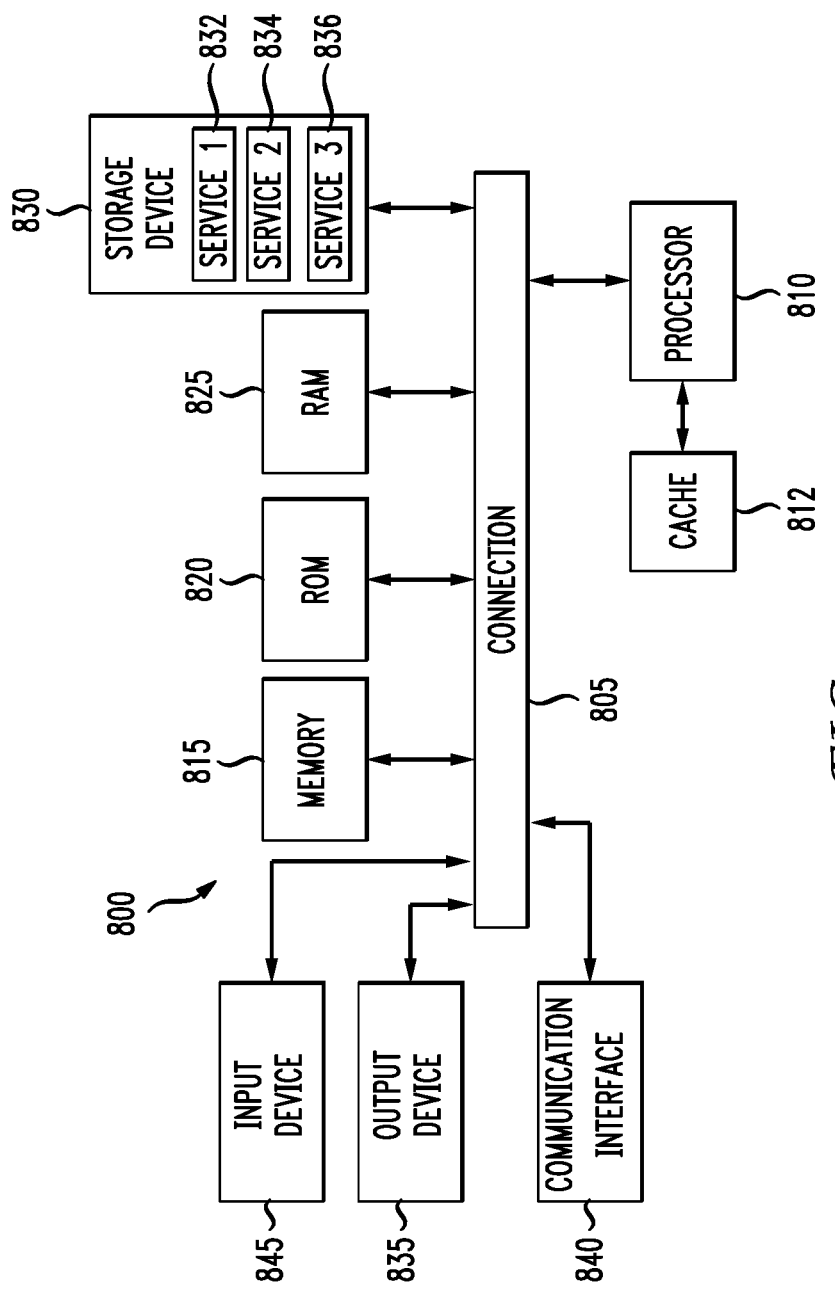
FIG. 8 illustrates an example computing device.

Having disclosed some example system components and concepts, the disclosure now turns to the example method shown in FIG. 7. For the sake of clarity, the method is described with reference to resource manager service 602, as shown in FIGS. 6A-6B, configured to perform the various steps in the method. The steps outlined herein are examples and can be implemented in any combination thereof, including combinations that exclude, add, or modify certain steps.

At step 702, resource manager service 602 collects respective resource consumption data for each of a plurality of resource consumer objects (e.g., resource consumer objects 110A-N) associated with a plurality of hosts (e.g., hosts 104) in a computing environment (e.g., computing environment 100 or 120). The resource consumption data can include resource consumption measurements at one or more intervals over a period of time (e.g., hourly measurements for each day over the course of a week or month, daily measurements for each week over the course of a month, etc.). Moreover, the resource consumption measurements can pertain to one or more resource consumption attributes, such as, without limitation, storage attributes (e.g., IOPS, capacity, latency, etc.), memory utilization, CPU utilization, network utilization, and/or any other usage attributes.

The resource consumption data can include raw data corresponding to the resource consumption measurements, as well as processed, analyzed, and/or summarized data, such as consumption averages, consumption trends (e.g., long term and/or short term trends), high consumption values (e.g., maximum values or values within a particular percentile), low consumption values (e.g., minimum values or values within a particular percentile), and/or any other statistical representations or calculations based on the raw data.

As previously mentioned, the resource consumer objects can refer to any virtual and/or software objects, environments, or platforms which consume resources in a computing environment, such as VMs, software containers, software applications, etc. Hosts can include one or more of hypervisors or virtual machine managers, servers (physical and/or logical or virtual), network devices (e.g., virtual or physical switches, etc.), software environments (e.g., operating systems, software container software, etc.), datacenters, etc.

At step 704, resource manager service 602 identifies, for each respective host from the plurality of hosts, a respective set of resource consumer objects currently hosted by the respective host. Resource manager service 602 can identify which resource consumer objects (and how many) are hosted at a particular host (e.g., which resource consumer objects are running on the particular host, deployed on the particular host, consuming resources from the particular host, residing on the particular host, managed by the on the particular host, etc.).

The resource consumer objects "currently" hosted by the respective host can refer to the most current or latest known resource consumer objects hosted by the respective host. However, it should be noted that, while step 704 refers to resource consumer objects "currently" hosted by the respective host, other configurations which apply a different timing or time period are also contemplated herein. For example, in some configurations, the resource manager service 602 can identify the resource consumer objects hosted by the host at a specific time or period, which can be a previous or contemporaneous time or period.

At step 706, resource manager service 602 determines, based on the respective resource consumption data, a projected resource consumption history for each respective host. The projected resource consumption history can include a combined resource consumption, over a predetermined period of time (e.g., T1 202 and T2 204), associated with the respective set of resource consumer objects currently hosted by the respective host. The respective set of resource consumer objects refers to the resource consumer objects identified at step 704. Thus, the combined resource consumption associated with the respective set of resource consumer objects can include the resource consumption calculated for the resource consumer objects identified at step 704 as the resource consumer objects currently at the respective host.

The combined resource consumption can include the resource consumption over a period of time from each of the resource consumer objects identified at step 704. Thus, the projected resource consumption history can model or reconstruct a historical resource consumption for the host which includes the combined resource consumption over a period of time from each resource consumer object identified at step 704. Accordingly, the projected resource consumption history can project what the resource consumption for that host over the period of time would be if the host had hosted the current resource consumer objects throughout the entire period of time, irrespective of whether the host actually did or did not host the current resource consumer objects throughout the entire period of time.

The combined resource consumption from the resource consumer object can be based on raw resource consumption data associated with the resource consumer objects and/or summarized or processed resource consumption data. For example, the combined resource consumption can be based on a summarized or representative resource consumption calculated for each resource consumer object, or a summarized or representative resource consumption calculated for the combined resource consumption data from the resource consumer objects.

The projected resource consumption history can include one or more values corresponding to one or more resource consumption attributes. For example, the projected resource consumption history can include one or more values for storage attributes, one or more values for CPU utilization, one or more values for memory utilization, etc.

At step 708, resource manager service 602 calculates a projected resource availability for each respective host based on a respective resource capability of the respective host and the projected resource consumption history for the respective host. For example, a projected resource availability can be calculated by comparing resource capabilities of the host and/or allocated resources (e.g., storage capacity, memory, CPU, network capabilities, etc.) with the projected resource consumption history for that host. This comparison can allow the resource manager service 602 to determine which hosts may not have adequate capacity for new, current, and/or projected loads; which host(s) may be better suited for hosting new resource consumer objects; how resources and/or resource consumer object placements may be adjusted for load balancing and forecasting purposes; etc.

In some cases, the projected resource availability can also take into account current or recent resource consumption at the hosts. For example, current resource consumption at the hosts can be measured to identify current consumption circumstances at each host. The projected resource availability can be calculated based on the current or recent resource consumption and/or the projected resource consumption history. To illustrate, the current resource consumption and projected resource consumption history can be used to identify a baseline consumption, a minimum consumption, etc.

For example, the current resource consumption and projected resource consumption history can be compared, and a specific value (e.g., the highest value, the lowest value, etc.) from the current resource consumption and the projected resource consumption history can be selected as the representative value, or the highest and lowest values can provide a range of values, etc. The selected and/or calculated value(s) can then be compared with the resource capacity of the host to determine the projected resource availability.

At step 710, resource manager service 602 selects, from the plurality of hosts, a particular host for a resource consumer object based on the projected resource availability calculated for each respective host. In some cases, the resource consumer object can be a new resource consumer object being deployed. Thus, the particular host is selected as the host for the new resource consumer object being deployed. In other cases, the resource consumer object is an existing resource consumer object. Here, the particular host can be identified as a host for migrating, copying, moving, extending, etc., the resource consumer object. If the resource consumer object is an existing resource consumer object, the particular host can be selected to replace or supplement an existing host of the resource consumer object. For example, the particular host can be selected for load balancing or resource managing purposes to adjust resource consumer object placements based on one or more factors, such as current conditions, predicted conditions, host capacity, resource allocations and capacities, failures, resource consumption demands, upgrades, resource consumer object requirements, growth in the number of resource consumer objects, variations in applications and/or loads in the computing environment, etc.

In some cases, the particular host is selected for the resource consumer object as part of an ongoing process for managing resources and placements which can involve dynamically or periodically adjusting placements and resource allocations. For example, the particular host can be selected to optimize placements in the computing environment based on current and/or forecasted resource consumption information.

The projected resource availability and/or the projected resource consumption history can be used to select or allocate logical resources to hosts and/or resource consumer objects. For example, projected resource consumption information associated with a host and/or resource consumption object can be used to determine if the host and/or resource consumption object has adequate logical resource allocated or whether logical resource allocations can be adjusted for one or more hosts and/or resource consumer objects.

When calculating the projected resource availability at step 708 and/or selecting a host at step 710, the resource manager service 602 can consider an estimated resource consumption associated with the resource consumer object to be placed in the particular host selected. For example, if the resource consumer object is an existing resource consumer object, a current resource consumption measurement and/or a historical resource consumption calculation for the existing resource consumer object can be included in calculating the projected resource availability or selecting a host. To illustrate, the projected resource availability can be calculated by subtracting from the host capacity both the projected resource consumption history and the estimated resource consumption for the resource consumer object.

If the resource consumer object is a new resource consumer object being deployed, the projected resource availability may be calculated, or the particular host selected, without an estimated resource consumption for that resource consumer object. However, in some cases, even if the resource consumer object is a new resource consumer object being deployed, an estimated resource consumption value for that resource consumer object may be calculated and applied based on a resource consumption expected for that resource consumer object, resource consumption data for similar resource consumer objects, resource consumption requirements for that resource consumer object, one or more characteristics of the resource consumer object, etc.

The method shown in FIG. 7 can be implemented a number of times in the computing environment. In this example, the method describes selecting a particular host for a resource consumer object. It should be noted that the method can be implemented for selecting hosts for any number of resource consumer objects, and may be implemented any number of times for resource consumer object placement decisions and adjustments, logical resource allocations, etc.

The disclosure now turns to FIG. 8, which illustrate example hardware components and an example device architecture for a computing device, such as resource manager service 602, physical systems or hardware components in layer 102, etc.

FIG. 8 illustrates an example computing system architecture 800 wherein the components of the system are in communication with each other using a connection 805. Connection 805 can be a physical connection via a bus, or direct connection into processor 810 such as in a chipset architecture. Connection 805 can also be a virtual connection, networked connection, or logical connection.

In some examples, system 800 can be a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 800 includes at least one processing unit (CPU or processor) 810 and a connection 805 that couples various system components including the system memory 815, such as read only memory (ROM) and random access memory (RAM) to the processor 810. The system 800 can include a cache of high-speed memory connected directly with, in close proximity to, or integrated as part of the processor 810.

The processor 810 can include any general purpose processor and a hardware service or software service, such as service 1 832, service 2 834, and service 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with hardware components, such as the processor 810, bus 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method to manage resources in a computing environment, the method comprising:
   collecting respective resource consumption data for each of a plurality of resource consumer objects associated with a plurality of hosts in the computing environment;
   for each respective host from the plurality of hosts, identifying a respective set of resource consumer objects currently hosted by the respective host;
   based on the respective resource consumption data, determining a projected resource consumption history for each respective host, wherein the projected resource consumption history:
      comprises a combined resource consumption, over a predetermined period of time, associated with the respective set of resource consumer objects that are currently being hosted by the respective host, the predetermined period of time immediately preceding a current time; and
      is a historical resource consumption reconstructed based on the respective host hosting the respective set of the currently hosted resource consumer objects through the predetermined period of time in entirety wherein the respective host did not host one or more resource consumer objects of the respective set of currently hosted resource consumer objects through the predetermined period of time in entirety;
   calculating a projected resource availability for each respective host based on a respective resource capability of the respective host and the projected resource consumption history for the respective host; and
   selecting, from the plurality of hosts, a particular host for a resource consumer object based on the projected resource availability calculated for each respective host.

2. The method of claim 1, further comprising:
   deploying the resource consumer object at the particular host; and
   allocating, to the resource consumer object, one or more resources associated with the particular host.

3. The method of claim 2, wherein the computing environment comprises a pool of resources, and wherein each respective host from the plurality of hosts is allocated a respective set of resources from the pool of resources.

4. The method of claim 3, wherein the respective host allocates at least a portion of the respective set of resources to the respective set of resource consumer objects currently hosted by the respective host, and wherein the one or more resources allocated to the resource consumer object comprise at least a portion of the respective set of resources allocated to the particular host.

5. The method of claim 4, wherein the pool of resources comprises at least one of storage resources, compute resources, virtualization resources, backup resources, memory, bandwidth resources, distributed resource clusters, and data switching or routing resources.

6. The method of claim 4, wherein the plurality of resource consumer objects comprises at least one of virtual machines and software containers, and wherein the plurality of hosts comprises at least one of hypervisors, servers, datacenters, and infrastructure appliances.

7. The method of claim 1, wherein the respective resource consumption data is collected at one or more time intervals over the predetermined period of time.

8. The method of claim 1, further comprising:
based on the respective resource consumption data, determining a respective resource consumption trend for each of the plurality of resource consumer objects corresponding to the predetermined period of time;
determining a current resource consumption for each of the plurality of resource consumer objects; and
calculating a projected resource demand for each of the plurality of resource consumer objects based on at least one of the respective resource consumption trend and the current resource consumption.

9. The method of claim 1, wherein determining the projected resource consumption history for each respective host is based on the projected resource demand for each of the plurality of resource consumer objects, and wherein the resource consumption associated with the particular resource consumer object is determined based on at least one of the respective resource consumption data and a current resource consumption measurement associated with the particular resource consumer object.

10. A system to manage resources in a computing environment, the system comprising:
one or more processors; and
at least one computer-readable storage medium having stored therein instructions which, when executed by the one or more processors, cause the system to:
collect respective resource consumption data for each of a plurality of resource consumer objects associated with a plurality of hosts in the computing environment;
for each respective host from the plurality of hosts, identify a respective set of resource consumer objects currently hosted by the respective host;
based on the respective resource consumption data, determining a projected resource consumption history for each respective host, wherein the projected resource consumption history:
comprises a combined resource consumption, over a predetermined period of time, associated with the respective set of resource consumer objects that are currently being hosted by the respective host, the predetermined period of time immediately preceding a current time; and
is a historical resource consumption reconstructed based on the respective host hosting the respective set of the currently hosted resource consumer objects through the predetermined period of time in entirety wherein the respective host did not host one or more resource consumer objects of the respective set of currently hosted resource consumer objects through the predetermined period of time in entirety;
calculate a projected resource availability for each respective host based on a respective resource capability of the respective host and the projected resource consumption history for the respective host; and
select, from the plurality of hosts, a particular host for a resource consumer object based on the projected resource availability calculated for each respective host.

11. The system of claim 10, the at least one computer-readable storage medium storing additional instructions which, when executed by the one or more processors, cause the system to:
deploy the resource consumer object at the particular host; and
allocate, to the resource consumer object, one or more resources associated with the particular host.

12. The system of claim 11, wherein the computing environment comprises a pool of resources, and wherein each respective host from the plurality of hosts is allocated a respective set of resources from the pool of resources.

13. The system of claim 12, wherein the one or more resources comprise at least a portion of the respective set of resources allocated to the particular host.

14. The system of claim 10, the at least one computer-readable storage medium storing additional instructions which, when executed by the one or more processors, cause the system to:
based on the respective resource consumption data, determine a respective resource consumption trend for each of the plurality of resource consumer objects corresponding to the predetermined period of time;
determine a current resource consumption for each of the plurality of resource consumer objects; and
calculate a projected resource demand for each of the plurality of resource consumer objects based on at least one of the respective resource consumption trend and the current resource consumption.

15. A non-transitory computer-readable storage medium to manage resources in a computing environment, the non-transitory computer-readable storage medium comprising:
instructions stored thereon which, when executed by one or more processors, cause the one or more processors to:
collect respective resource consumption data for each of a plurality of resource consumer objects associated with a plurality of hosts in the computing environment;
for each respective host from the plurality of hosts, identify a respective set of resource consumer objects currently hosted by the respective host;
based on the respective resource consumption data, determining a projected resource consumption history for each respective host, wherein the projected resource consumption history:
comprises a combined resource consumption, over a predetermined period of time, associated with the respective set of resource consumer objects that are currently being hosted by the respective host, the predetermined period of time immediately preceding a current time; and is a historical resource consumption reconstructed based on the respective host hosting the respective set of the currently hosted resource consumer objects through the predetermined period of time in entirety wherein the respective host did not host one or more resource consumer objects of the respective set of currently hosted resource consumer objects through the predetermined period of time in entirety;

determine a projected resource availability for each respective host based on a respective resource capability of the respective host and the projected resource consumption history for the respective host; and select, from the plurality of hosts, a particular host for a resource consumer object based on the projected resource availability calculated for each respective host.

16. The non-transitory computer-readable storage medium of claim 15, wherein the computing environment comprises a pool of resources, and wherein each respective host from the plurality of hosts is allocated a respective set of resources from the pool of resources, the non-transitory computer-readable storage medium storing additional instructions which, when executed by the one or more processors, cause the one or more processors to:

deploy the resource consumer object at the particular host; and allocate, to the resource consumer object, one or more of the respective set of resources associated with the particular host.

17. The non-transitory computer-readable storage medium of claim 15, storing additional instructions which, when executed by the one or more processors, cause the one or more processors to:

based on the respective resource consumption data, determine a respective resource consumption trend for each of the plurality of resource consumer objects corresponding to the predetermined period of time, wherein the respective resource consumption data is collected at one or more time intervals over the predetermined period of time;

determine a current resource consumption for each of the plurality of resource consumer objects; and calculate a projected resource demand for each of the plurality of resource consumer objects based on at least one of the respective resource consumption trend and the current resource consumption.

18. The method of claim 1, further comprising, for each respective host from the plurality of hosts:

generating a three-dimensional matrix of resource consumption data for each of the plurality of resource consumer objects; and converting the resource consumption data in the matrix into a consumption array by sorting the data and taking a defined percentile of hourly values for each host.

19. The system of claim 10, wherein for each respective host from the plurality of hosts:

a three-dimensional matrix of resource consumption data for each of the plurality of resource consumer objects is generated; and the resource consumption data in the matrix is converted into a consumption array by sorting the data and taking a defined percentile of hourly values for each host.

20. The non-transitory computer-readable storage medium of claim 15, storing additional instructions which, when executed by the one or more processors, cause the one or more processors to, for each respective host from the plurality of hosts:

generate a three-dimensional matrix of resource consumption data for each of the plurality of resource consumer objects; and convert the resource consumption data in the matrix into a consumption array by sorting the data and taking a defined percentile of hourly values for each host.

* * * * *